United States Patent Office 3,300,485
Patented Jan. 24, 1967

3,300,485
3-OXO-Δ⁵-THIENO OR FURO[4′,3′,2′-4,5,6]STEROIDS AND PROCESS FOR THE PRODUCTION THEREOF
Taichiro Komeno, Osaka-shi, Japan, assignor to Shionogi & Co., Ltd., Osaka, Japan
No Drawing. Filed Jan. 3, 1964, Ser. No. 335,662
Claims priority, application Japan, Apr. 3, 1962, 37/13,418
25 Claims. (Cl. 260—239.5)

The present application is a continuation-in-part of copending application Serial No. 269,899, filed April 2, 1963 (abandoned since the filing of the present application).

The present invention relates to steroids having a condensed heterocyclic ring at the 4-, 5- and 6-positions and production thereof. More particularly, it relates to 3-oxo-Δ⁵-thieno[4′,3′,2′-4,5,6]steroids and 3 - oxo - Δ⁵ - furo-[4′,3′,2′-4,5,6]steroids, and production thereof.

The said 3-oxo-Δ⁵-thieno or furo[4′,3′,2′-4,5,6-]steroids are intended to mean the steroids having the partial structural formula:

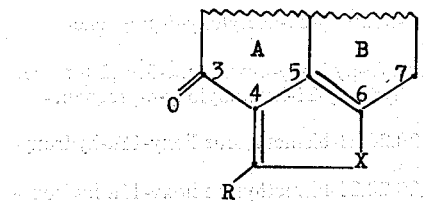

wherein R is hydrogen or lower alkyl (e.g. methyl, ethyl, propyl, isopropyl, butyl, pentyl) and X is sulfur or oxygen.

It is an object of the present invention to embody the said 3-oxo-Δ⁵-thieno or furo[4′,3′,2′,-4,5,6]steroids. Another object of this invention is to embody a generally applicable process for constructing a condensed thiophene or furane nucleus at the 4-, 5- and 6-positions of steroid. Another object of this invention is to embody the 3-oxo-Δ⁵-thieno or furo[4′,3′,2′-4,5,6]steroids having pharmacological activity. A further object of the invention is to embody starting compounds in production of the 3-oxo-Δ⁵-thieno or furo[4′,3′,2′-4,5,6]steroids. These and other objects will be apparent to those conversant with the art to which the present invention pertains from the subsequent description.

The objective 3-oxo-Δ⁵-thieno or furo[4′,3′,2′-4,5,6]-steroid can be prepared from the corresponding 3-oxo-Δ⁴-6-acylthio or acyloxysteriod by subjecting the latter to dehydrative ring closure, the conversion being representable by the following partial formula scheme:

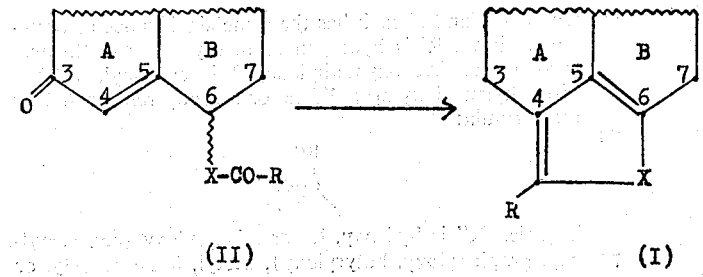

wherein R and X each has the same significance as designated above and the ripple mark (∫) represents a generic configuration of α- and β-configurations.

The said dehydrative ring closure is generally applicable to 3-oxo-Δ⁴-6-acylthio or acyloxysteroids having the partial structure of Formula II. The steric configuration of the acylthio or acyloxy group at the 6-position of the starting material has substantially no effect on the reaction; that is, the acylthio or acyloxy group may have α- or β-configuration. Furthermore, such a substituent which does not exert any substantial effect on the reaction, as 1-methyl, 1-methoxy, 9-fluoro, 11-oxo, 16-methyl, 17-methyl, 17-ethynyl, 17-hydroxy, 17-oxo or 17-acetyl, may exist at any position except the 3- to 7-positions on steroid skeleton. Specific examples of the 3-oxo-Δ⁴-6-acylthio or acyloxysteriod include 6α-formylthio-4-androstene-3,17-dione,
6α-acetylthio-4-androstene-3,17-dione,
6β-acetylthio-4-androstene-3,17-dione,
6α-propionylthio-4-androstene-3,17-dione,
6α-butyrylthio-4-androstene-3,17-dione,
6β-valerylthio-4-androstene-3,17-dione,
6α-acetylthio-17β-acetyloxy-4-androsten-3-one,
6β-acetylthio-17β-acetyloxy-4-androsten-3-one,
6α-propionylthio-17β-acetyloxy-4-androsten-3-one,
6α-propionylthio-17β-propionyloxy-4-androsten-3-one,
6β-acetylthio-17β-propionyloxy-4-androsten-3-one,
6β-acetylthio-17β-hexanoyloxy-4-androsten-3-one,
6α-acetylthio-17β-hydroxy-4-androsten-3-one,
6α-propionylthio-17β-hydroxy-4-androsten-3-one,
6α-butyrylthio-17β-hydroxy-4-androsten-3-one,
6α-formylthio-17β-hydroxy-17α-methyl-4-androsten-3-one,
6α-acetylthio-17β-acetyloxy-4-estren-3-one,
6β-acetylthio-17β-acetyloxy-4-estren-3-one,
6α-butyrylthio-17β-acetyloxy-4-estren-3-one,
6β-valerylthio-17β-acetyloxy-4-estren-3-one,
6α-acetylthio-17β-hydroxy-4-estren-3-one,
6β-acetylthio-17β-hydroxy-4-estren-3-one,
6β-propionylthio-17β-hydroxy-4-estren-3-one,
6α-acetylthio-17β-acetyloxy-17β-ethynyl-4-estren-3-one,
6α-propionylthio-17β-acetyloxy-17α-ethynyl-4-estren-3-one,
6β-propionylthio-17β-acetyloxy-17α-ethynyl-4-estren-3-one,
6α-acetylthio-17β-hydroxy-17α-ethynyl-4-estren-3-one,
6α-propionylthio-17β-hydroxy-17α-ethynyl-4-estren-3-one,
6α-acetylthio-4-pregnene-3,20-dione,
6β-acetylthio-4-pregnene-3,20-dione,
6α-propionylthio-4-pregnene-3,20-dione,
6β-propionylthio-4-pregnene-3,20-dione,
6α-propionylthio-4-pregnene-3,20-dione,
6β-acetylthio-17α-hydroxy-4-pregnene-3,20-dione, 6α-propionylthio-17α-hydroxy-4-pregnene-3,20-dione,
6α-acetylthio-4-cholesten-3-one,
6β-acetylthio-4-cholesten-3-one,
6α-propionylthio-4-cholesten-3-one,
6β-butyrylthio-4-cholesten-3-one,
6β-acetylthio-4-spirosten-3-one,
6α-acetylthio-17,20,20,21-bismethylenedioxy-4-pregnen-3-one,
6β-acetylthio-17,20,20,21-bismethylenedioxy-4-pregnen-3-one,
6α-propionylthio-17,20,20,21-bismethylenedioxy-4-pregnen-3-one,
6β-butyrylthio-17,20,20,21-bismethylenedioxy-4-pregnen-3-one,
6α-acetylthio-17α,21-dihydroxy-4-pregnene-3,20-dione,
6β-acetylthio-17α,21-dihydroxy-4-pregnene-3,20-dione,
6α-acetylthio-17α-hydroxy-21-acetyloxy-4-pregnene-3,20-dione,
6β-acetylthio-17α-hydroxy-21-acetyloxy-4-pregnene-3,20-dione,
6α-acetylthio-17,20,20,21-bismethylenedioxy-4-pregnene-3,11-dione,
6β-propionylthio-17,20,20,21-bismethylenedioxy-4-pregnene-3,11-dione,
6α-butyrylthio-17,20,20,21-bismethylenedioxy-4-pregnene-3,11-dione,
6α-acetylthio-17α,21-dihydroxy-4-pregnene-3,11,20-trione,
6β-acetylthio-17α,21-dihydroxy-4-pregnene-3,11,20-trione,
6α-valerylthio-17α,21-dihydroxy-4-pregnene-3,11,20-trione,
6α-acetylthio-17α-hydroxy-21-acetyloxy-4-pregnene-3,11,20-trione,
6β-acetylthio-17α-hydroxy-21-acetyloxy-4-pregnene-3,11,20-trione,
6β-acetylthio-17α-hydroxy-21-hexanoyloxy-4-pregnene-3,11,20-trione,
6α-acetylthio-17,20,20,21-bismethylenedioxy-11α-hydroxy-4-pregnen-3-one,
6β-acetylthio-17,20,20,21-bismethylenedioxy-11α-hydroxy-4-pregnen-3-one,
6α-acetylthio-17,20,20,21-bismethylenedioxy-11β-hydroxy-4-pregnen-3-one,
6β-acetylthio-17,20,20,21-bismethylenedioxy-11β-hydroxy-4-pregnen-3-one,
6α-acetylthio-17α,21-dihydroxy-4-pregnene-3,20-dione,
6β-acetylthio-17α,21-dihydroxy-4-pregnene-3,20-dione,
6α-acetylthio-17α-hydroxy-21-acetyloxy-4-pregnene-3,20-dione,
6β-acetylthio-17α-hydroxy-21-acetyloxy-4-pregnene-3,20-dione,
6α-propionylthio-17α,21-dihydroxy-4-pregnene-3,20-dione,
6β-acetylthio-11β,17α,21-trihydroxy-4-pregnene-3,20-dione,
6α-acetylthio-11β,17α-dihydroxy-21-butyryloxy-4-pregnene-3,20-dione,
6β-acetylthio-11β,17α-dihydroxy-21-butyryloxy-4-pregnene-3,20-dione,
6α-propionylthio-11α,17α,21-trihydroxy-4-pregnene-3,20-dione,
6α-acetylthio-17,20,20,21-bismethylenedioxy-11α-acetyloxy-4-pregnen-3-one,
6β-acetylthio-17,20,20,21-bismethylenedioxy-11α-acetyloxy-4-pregnen-3-one,
6α-acetylthio-17α-hydroxy-11β,21-diacetyloxy-4-pregnene-3,20-dione,
6α-acetyloxy-4-androstene-3,17-dione,
6β-acetyloxy-4-androstene-3,17-dione,
6α-propionyloxy-4-androstene-3,17-dione,
6α-butyryloxy-4-androstene-3,17-dione,
6β-butyryloxy-4-androstene-3,17-dione,
6α-valeryloxy-4-androstene-3,17-dione,
6α,17β-diacetyloxy-4-androsten-3-one,
6β-17β-diacetyloxy-4-androsten-3-one,
6β-propionyloxy-17β-acetyloxy-4-androsten-3-one, 6α,17β-dipropionyloxy-4-androsten-3-one,
6β-acetyloxy-17β-propionyloxy-4-androsten-3-one,
6α-acetyloxy-17β-hydroxy-4-androsten-3-one,
6β-propionyloxy-17β-hydroxy-4-androsten-3-one,
6β-acetyloxy-17β-hydroxy-17α-methyl-4-androsten-3-one,
6α,17β-diacetyloxy-4-estren-3-one,
6β,17β-diacetyloxy-4-estren-3-one,
6β-valeryloxy-17β-acetyloxy-4-estren-3-one,
6α-acetyloxy-17β-hydroxy-4-estren-3-one,
6β-acetyloxy-17β-hydroxy-4-estren-3-one,
6β-propionyloxy-17β-hydroxy-4-estren-3-one,
6α,17β-diacetyloxy-17α-ethynyl-4-estren-3-one,
6β-formyloxy-17β-acetyloxy-17α-ethynyl-4-estren-3-one,
6α-formyloxy-4-pregnene-3,20-dione,
6β-acetyloxy-4-pregnene-3,20-dione,
6α-propionyloxy-4-pregnene-3,20-dione,
6β-propionyloxy-4-pregnene-3,20-dione,
6α-acetyloxy-17α-hydroxy-4-pregnene-3,20-dione,
6α-formyloxy-4-cholesten-3-one,
6β-acetyloxy-4-cholesten-3-one,
6β-propionyloxy-17,20,20,21-bismethylenedioxy-4-pregnen-3-one,
6α-acetyloxy-17α,21-dihydroxy-4-pregnene-3,20-dione,
6β-acetyloxy-17α,21-dihydroxy-4-pregnene-3,20-dione,
6β-acetyloxy-17α-hydroxy-21-propionyloxy-4-pregnene-3,20-dione,
6β-propionyloxy-17,20,20,21-bismethylenedioxy-4-pregnene-3,11-dione,
6α-butyryloxy-17,20,20,21-bismethylenedioxy-4-pregnene-3,11-dione,
6α-acetyloxy-17α,21-dihydroxy-4-pregnene-3,11,20-trione,
6α-valeryloxy-17α,21-dihydroxy-4-pregnene-3,11,20-trione,
6α-formyloxy-17α-hydroxy-21-acetyloxy-4-pregnene-3,11,20-trione,
6β,21-diacetyloxy-17α-hydroxy-4-pregnene-3,11,20-trione,
6β-acetyloxy-17α-hydroxy-21-hexanoyloxy-4-pregnene-3,11,20-trione,
6α-acetyloxy-17,20,20,21-bismethylenedioxy-11α-hydroxy-4-pregnen-3-one,
6β-acetyloxy-17,20,20,21-bismethylenedioxy-11α-hydroxy-4-pregnen-3-one,
6α-acetyloxy-17,20,20,21-bismethylenedioxy-11β-hydroxy-4-pregnen-3-one,
6β-acetyloxy-17,20,20,21-bismethylenedioxy-11β-hydroxy-4-pregnen-3-one,
6α-acetyloxy-17α,21-dihydroxy-4-pregnene-3,20-dione,
6β-acetyloxy-17α,21-dihydroxy-4-pregnene-3,20-dione, etc. Although, as stated above, the dehydrative ring closure can be broadly applied to steroids inasmuch as they possess the partial structure of Formula II, especially preferred starting compounds may be represented by the following generic formula:

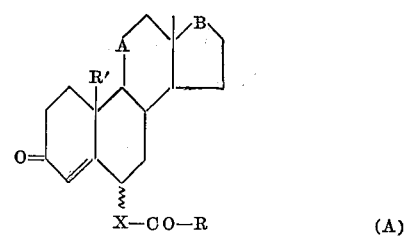

(A)

wherein R and X each has the same significance as designated above, R' is hydrogen or methyl, A is methylene, carbonyl or hydroxymethylene, B is carbonyl, 1,2,2,3-bismethylenedioxy-propylidene or a group represented by the formula:

in which R'' is hydroxy, lower alkanoyloxy (e.g. acetyloxy, propionyloxy, butyryloxy), acetyl, hydroxyacetyl or lower alkanoyloxyacetyl (e.g. acetyloxyacetyl, propionyloxyacetyl, butyryloxyacetyl) and R''' is hydrogen, lower alkyl (e.g. methyl, ethyl, propyl, butyl), lower alkenyl (e.g. allyl, propenyl), lower alkynyl (e.g. ethynyl, propynyl), hydroxy or lower alkanoyloxy (e.g. acetyloxy, propionyloxy, butyryloxy).

The dehydrative ring closure may be carried out by treating the 3-oxo-$\Delta^4$-6-acylthio or acyloxysteroid having the partial structure of Formula II with a basic agent in an inert organic solvent medium. As the basic agent, there may be used alumina, alkali metal lower alkoxide (e.g. sodium methoxide, sodium ethoxide, sodium propoxide, potassium ethoxide, potassium isopropoxide, potassium t-butoxide, lithium epoxide, lithium propoxide), alkali metal hydride (e.g. sodium hydride, potassium hydride), alkali metal carbonate (e.g. sodium carbonate, potassium carbonate) and the like. Examples of the suitable inert organic solvent include hydrocarbons (e.g. benzene, toluene, petroleum ether, hexane, heptane, cyclohexane), ethers (e.g. diethyl ether, diisopropyl ether, diphenyl ether, dioxane, tetrahydrofuran), alkanols (e.g. methanol, ethanol, propanol, t-butanol, isopentanol), etc. The reaction is usually performed at a temperature from room temperature (10 to 30° C.) to reflux temperature for a period of several to several tens hours, a lower temperature requiring a longer reaction time. In practice, selection of a suitable solvent and reaction conditions may be made in consideration of the properties of the 3-oxo-$\Delta^4$-6-acylthio or acyloxysteroid and the basic agent used.

As the result of the dehydrative ring closure, there is produced the corresponding 3-oxo-$\Delta^5$-thieno or furo-[4',3',2'-4,5,6]steroid having the partial structure of Formula I. Specific examples of the 3-oxo-$\Delta^5$-thieno or furo[4',3',2'-4,5,6]steroid include thieno[4',3',2'-4,5,6]-5-androstene-3,17-dione,
5'-methylthieno[4',3',2'-4,5,6]-5-androstene-3,17-dione,
5'-ethylthieno[4',3',2'-4,5,6]-5-androstene-3,17-dione,
5'-propylthieno[4',3',2'-4,5,6]-5-androstene-3,17-dione,
5'-butylthieno[4',3',2'-4,5,6]-5-androstene-3,17-dione,
17$\beta$-acetyloxy-5'-methylthieno[4',3',2'-4,5,6]-5-androsten-3-one,
17$\beta$-acetyloxy-5'-ethylthieno[4',3',2'-4,5,6]-5-androsten-3-one,
17$\beta$-propionyloxy-5'-ethylthieno[4',3',2'-4,5,6]-5-androsten-3-one,
17$\beta$-propionyloxy-5'-methylthieno[4',3',2'-4,5,6]-5-androsten-3-one,
17$\beta$-hexanoyloxy-5'-methylthieno[4',3',2'-4,5,6]-5-androsten-3-one,
17$\beta$-hydroxy-5'-methylthieno[4',3',2'-4,5,6]-5-androsten-3-one,
17$\beta$-hydroxy-5'-ethylthieno[4',3',2'-4,5,6]-5-androsten-3-one,
17$\beta$-hydroxy-5'-propylthieno[4',3',2'-4,5,6]-5-androsten-3-one,
17$\beta$-hydroxy-17$\alpha$-methylthieno[4',3',2'-4,5,6]-5-androsten-3-one,
17$\beta$-acetyloxy-5'-methylthieno[4',3',2'-4,5,6]-5-estren-3-one,
17$\beta$-acetyloxy-5'-propylthieno[4',3',2'-4,5,6]-5-estren-3-one,
17$\beta$-acetyloxy-5'-butylthieno[4',3',2'-4,5,6]-5-estren-3-one,
17$\beta$-hydroxy-5'-methylthieno[4',3',2'-4,5,6]-5-estren-3-one,
17$\beta$-hydroxy-5'-ethylthieno[4',3',2'-4,5,6]-5-estren-3-one,
17$\beta$-acetyloxy-17$\alpha$-ethynyl-5'-methylthieno[4',3',2'-4,5,6]-5-estren-3-one,
17$\beta$-acetyloxy-17$\alpha$-ethynyl-5'-ethylthieno[4',3',2'-4,5,6]-5-estren-3-one,
17$\beta$-hydroxy-17$\alpha$-ethynyl-5'-methylthieno[4',3',2'-4,5,6]-5-estren-3-one,
17$\beta$-hydroxy-17$\alpha$-ethynyl-5'-ethylthieno[4',3',2'-4,5,6]-5-estren-3-one,
5'-methylthieno[4',3',2'-4,5,6]-5-pregnene-3,20-dione,
5'-ethylthieno[4',3',2'-4,5,6]-5-pregnene-3,20-dione,
17$\alpha$-hydroxy-5'-methylthieno[4',3',2'-4,5,6]-5-pregnene-3,20-dione,
17$\alpha$-hydroxy-5'-ethylthieno[4',3',2'-4,5,6]-5-pregnene-3,20-dione,
5'-methylthieno[4',3',2'-4,5,6]-5-cholesten-3-one,
5'-ethylthieno[4',3',2'-4,5,6]-5-cholesten-3-one,
5'-propylthieno[4',3',2'-4,5,6]-5-cholesten-3-one,
5'-methylthieno[4',3',2'-4,5,6]-5-spirosten-3-one,
17,20,20,21-bismethylenedioxy-5'-methylthieno[4',3',2'-4,5,6]-5-pregnen-3-one,
17,20,20,21-bismethylenedioxy-5'-ethylthieno[4',3',2'-4,5,6]-5-pregnen-3-one,
17,20,20,21-bismethylenedioxy-5'-propylthieno[4',3',2'-4,5,6]-5-pregnen-3-one,
17$\alpha$,21-dihydroxy-5'-methylthieno[4',3',2'-4,5,6]-5-pregnene-3,20-dione,
17$\alpha$-hydroxy-21-acetyloxy-5'-methylthieno[4',3',2'-4,5,6]-5-pregnene-3,20-dione,
17,20,20-21-bismethylenedioxy-5'-methylthieno[4',3',2'-4,5,6]-5-pregnene-3,11-dione,
17,20,20,21-bismethylenedioxy-5'-ethylthieno[4',3',2'-4,5,6]-5-pregnene-3,11-dione,
17,20,20,21-bismethylenedioxy-5'-propylthieno[4',3',2'-4,5,6]-5-pregnene-3,11-dione,
17$\alpha$,21-dihydroxy-5'-methylthieno[4',3',2'-4,5,6]-5-pregnene-3,11,20-trione,
17$\alpha$,21-dihydroxy-5'-butylthieno[4',3',2'-4,5,6]-5-pregnene-3,11,20-trione,
17$\alpha$-hydroxy-21-acetyloxy-5'-methylthieno[4',3',2'-4,5,6]-5-pregnene-3,11,20-trione,
17$\alpha$-hydroxy-21-hexanoyloxy-5'-methylthieno-[4',3',2'-4,5,6]-5-pregnene-3,11,20-trione,
17,20,20,21-bismethylenedioxy-11$\alpha$-hydroxy-5'-methylthieno[4',3',2'-4,5,6]-5-pregnen-3-one,
17,20,20,21-bismethylenedioxy-11$\beta$-hydroxy-5'-methylthieno[4',3',2'-4,5,6]-5-pregnen-3-one,
17$\alpha$,21-dihydroxy-5'-methylthieno[4',3',2'-4,5,6]-5-pregnene-3,20-dione,
17$\alpha$-hydroxy-21-acetyloxy-5'-methylthieno[4',3',2'-4,5,6]-5-pregnene-3,20-dione,
17$\alpha$,21-dihydroxy-5'-ethylthieno[4',3',2'-4,5,6]-5-pregnene-3,20-dione,
11$\beta$,17$\alpha$,21-trihydroxy-5'-methylthieno[4',3',2'-4,5,6]-5-pregnene-3,20-dione,
11$\beta$,17$\alpha$-dihydroxy-21-butyryloxy-5'-methylthieno-[4',3',2'-4,5,6]-5-pregnene-3,20-dione,
11$\alpha$,17$\alpha$,21-trihydroxy-5'-ethylthieno[4',3',2'-4,5,6]-5-pregnene-3,20-dione,
17,20,20,21-bismethylenedioxy-11$\alpha$-acetyloxy-5'-methylthieno[4',3',2'-4,5,6]-5-pregnen-3-one,
17$\alpha$-hydroxy-11$\beta$,21-diacetyloxy-5'-methylthieno-[4',3',2'-4,5,6]-5-pregnene-3,20-dione,
5'-methylfuro[4',3',2'-4,5,6]-5-androstene-3,17-dione,
5'-ethylfuro[4',3',2'-4,5,6]-5-androstene-3,17-dione,
5'-butylfuro[4',3',2'-4,5,6]-5-androstene-3,17-dione,
17$\beta$-acetyloxy-5'-methylfuro[4',3',2'-4,5,6]-5-androsten-3-one,
17$\beta$-acetyloxy-5'-ethylfuro[4',3',2'-4,5,6]-5-androsten-3-one,
17$\beta$-propionyloxy-5'-ethylfuro[4',3',2'-4,5,6]-5-androsten-3-one,
17$\beta$-hydroxy-5'-methylfuro[4',3',2'-4,5,6]-5-androsten-3-one,
17$\beta$-hydroxy-5'-ethylfuro[4',3',2'-4,5,6]-5-androsten-3-one,
17$\beta$-hydroxy-17$\alpha$-methyl-5'-methylfuro[4',3',2'-4,5,6]-5-androsten-3-one,
17$\beta$-acetyloxy-5'-methylfuro[4',3',2'-4,5,6]-5-estren-3-one,
17$\beta$-acetyloxy-5'-butylfuro[4',3',2'-4,5,6]-5-estren-3-one, 17β-hydroxy-5'-methylfuro[4',3',2'-4,5,6]-5-estren-
3-one,
17β-hydroxy-5'-ethylfuro[4',3',2'-4,5,6]-5-estren-3-one,
17β-acetyloxy-17α-ethynyl-5'-methylfuro[4',3',2'-
4,5,6]-5-estren-3-one,
17β-acetyloxy-17α-ethynylfuro[4',3',2'-4,5,6]-5-
estren-3-one,
furo[4',3',2'-4,5,6]-5-pregnene-3,20-dione,
5'-methylfuro[4',3',2'-4,5,6]-5-pregnene-3,20-dione,
5'-ethylfuro[4',3',2'-4,5,6]-5-pregnene-3,20-dione,
17α-hydroxy-5'-methylfuro[4',3',2'-4,5,6]-5-pregnene-
3,20-dione,
furo[4',3',2'-4,5,6]-5-cholesten-3-one,
5'-methylfuro[4',3',2'-4,5,6]-5-cholesten-3-one,
17,20,20,21-bismethylenedioxy-5'-ethylfuro[4',3',2'-
4,5,6]-5-pregnen-3-one,
17α,21-dihydroxy-5'-methylfuro[4',3',2'-4,5,6]-5-
pregnene-3,20-dione,
17α-hydroxy-21-propionyloxy-5'-methylfuro[4',3',2'-
4,5,6]-5-pregnene-3,20-dione,
17,20,20,21-bismethylenedioxy-5'-methylfuro[4',3',2'-
4,5,6]-5-pregnene-3,11-dione,
17,20,20,21-bismethylenedioxy-5'-propylfuro[4',3',2'-
4,5,6]-5-pregnene-3,11-dione,
17α,21-dihydroxy-5'-methylfuro[4',3',2'-4,5,6]-5-
pregnene-3,11,20-trione,
17α,21-dihydroxy-5'-butylfuro[4',3',2'-4,5,6]-5-
pregnene-3,11,20-trione,
17α-hydroxy-21-acetyloxyfuro[4',3',2'-4,5,6]-5-
pregnene-3,11,20-trione,
17α-hydroxy-21-acetyloxy-5'-methylfuro[4',3',2'-4,5,6]-
5-pregnene-3,11,20-trione,
17α-hydroxy-21-hexanoyloxy-5'-methylfuro[4',3',2'-
4,5,6]-5-pregnene-3,11,20-trione,
17,20,20,21-bismethylenedioxy-11α-hydroxy-5'-methyl-
furo[4',3',2'-4,5,6]-5-pregnen-3-one,
17,20,20,21-bismethylenedioxy-11β-hydroxy-5'-methyl-
furo[4',3',2'-4,5,6]-5-pregnen-3-one, etc. Especially preferred products may be represented by the following generic formula:

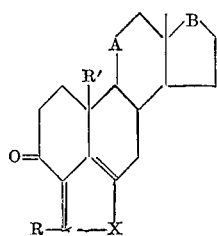

(B)

wherein R, R', X, A and B each has the same significance as designated above.

The 3-oxo-Δ⁵-thieno or furo[4',3',2'-4,5,6]steroids are useful as antagonists to hormonic substances. Especially, the 3-oxo-Δ⁵-thieno or furo[4',3',2'-4,5,6]steroids represented by Formula B generally and characteristically exhibit anti-progestational and/or anti-deciduomatogenic activities and are useful as anti-fertility agents. For instance, intrauterine injection of those compounds (e.g.

5'-methylthieno[4',3',2'-4,5,6]-5-pregnene-3,20-dione,
17β-acetyloxy-5'-methylthieno[4',3',2'-4,5,6]-5-estren-
3-one,
17β-acetyloxy-17α-ethynyl-5'-methylthieno[4',3',2'-
4,5,6]-5-estren-3-one,
17β-acetyloxy-5'-methylfuro[4',3',2'-4,5,6]-5-androsten-
3-one,
5'-methylfuro[4',3',2'-4,5,6]-5-pregnene-13,20-dione)

at a dose smaller than 2.5 milligrams per horn produced significant block of progestational response induced by subcutaneous administration of 4 milligrams of progesterone in the Clauberg rabbits (the estrogen-primed immature rabbits). Further, for instance, intrauterine injection of those compounds (e.g.

5'-methylthieno[4',3',2'-4,5,6]-5-androstene-3,17-dione,
17β-hydroxy-5'-methylthieno[4',3',2'-4,5,6]-5-androsten-
3-one,
17β-acetyloxy-5'-methylthieno[4',3',2'-4,5,6]-5-
androsten-3-one,
5'-methylthieno[4',3',2'-4,5,6]-5-pregnene-3,20-dione,
17β-acetyloxy-5'-methylthieno[4',3',2'-4,5,6]-5-
estren-3-one)

at a dose smaller than 0.2 milligram per horn produced significant block of decidual growth induced by subcutaneous administration of 3.6 milligrams of progesterone in the sprayed female mice. In addition, those compounds each may exhibit any other physiological activity. For instance, 17β - acetyloxy-5'-methylthieno[4',3',2'-4,5,6]-5-estren-3-one and 17β - acetyloxy-17α-ethynyl-5'-methylthieno[4',3',2'-4,5,6]-5-estren - 3 - one showed uterotropic activity and 17β-acetyloxy-5'-methylfuro[4',3',2'-4,5,6]-5-androsten-3-one showed anti-androgenic activity.

Still, the starting 3-oxo-Δ⁴-6-acylthio or acyloxy-steroids having the partial structure of Formula II may be prepared by various novel or conventional procedures. Some typical procedures are illustrated below.

(1) Dehydration of 3-oxo-5α-hydroxy-6β-acylthio or acyloxysteroids:

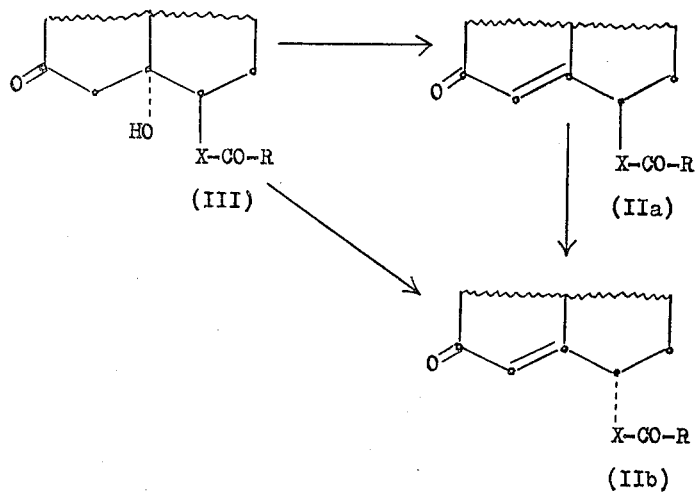

wherein R and X each has the same significance as designated above.

In this procedure, the 3-oxo-5α-hydroxy-6β-acylthio or acyloxysteroid having the partial structure of Formula III, which is produced by reacting the corresponding 3-oxo-5α,6α-epoxysteroid with alkanethiolic acid or alkanoic acid, is treated with an acid (e.g. hydrochloric acid, hydrobromic acid, sulfuric acid, phosphoric acid, methanesulfonic acid, p-toluene-sulfonic acid, formic acid, acetic acid) or a combination of an inorganic oxyacid halide (e.g. thionyl chloride, thionyl bromide, phosphorus oxychloride, phosphorus oxybromide) with an organic base (e.g. pyridine, picoline, trimethylamine, triethylamine, dimethylaniline), if desired, in a suitable solvent (e.g. acetic acid, dimethylformamide, methylsuccinimide, acetone, dioxane, tetrahydrofuran) at a relatively low temperature from about 0 to about 30° C. for a wide range of period from few minutes to several tens hours whereby the 3-oxo-Δ⁴-6β-acylthio or acyloxysteroid having the partial structure of Formula IIa or the 3-oxo-Δ⁴-6α-acylthio or acyloxysteroid having the partial structure of Formula IIb is obtained. Generally stated, the use of an acid as the reagent gives the 6α-isomer and the use of a combination of an inorganic oxyacid halide with an organic base affords the 6β-isomer. The 6β-isomer can be readily converted into the 6α-isomer by treating the former with the acid as stated above.

(2) Substitution of the halogen atom at the 6-position of 3-oxo-Δ⁴-6β-halogenosteroids with an acylthio group:

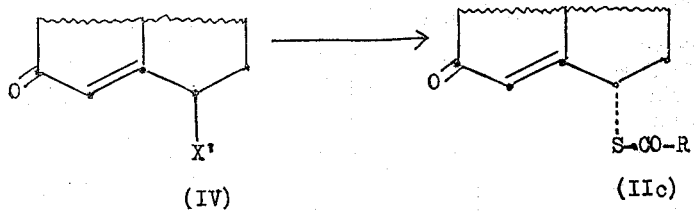

wherein X' is halogen (e.g. chlorine, bromine, iodine) and R has the same significance as designated above.

In this procedure, the 3-oxo-Δ⁴-6β-halogenosteroid having the partial structure of Formula IV, which is produced by reacting the corresponding 3-oxo-Δ⁴-steroid with a halogenating agent, is treated with alkali metal alkanethiolate (e.g. sodium thiolacetate, sodium thiolpropionate, potassium thiolacetate, potassium thiolpropionate, potassium thiolbutyrate) in an inert solvent (e.g. dimethylformamide, acetone, methyl ethyl ketone) normally at room temperature (10 to 30° C.) for several hours whereby the 3-oxo-Δ⁴-6α-acylthiosteroid having the partial structure of Formula IIc is obtained. It may be noted that the use of alkali metal alkanoate in place of alkali metal alkanethiolate in this procedure results in introduction of an acyl group into not the 6-position but the 2-position.

(3) Acylation of 3-oxo-Δ⁴-6β-hydroxysteroids:

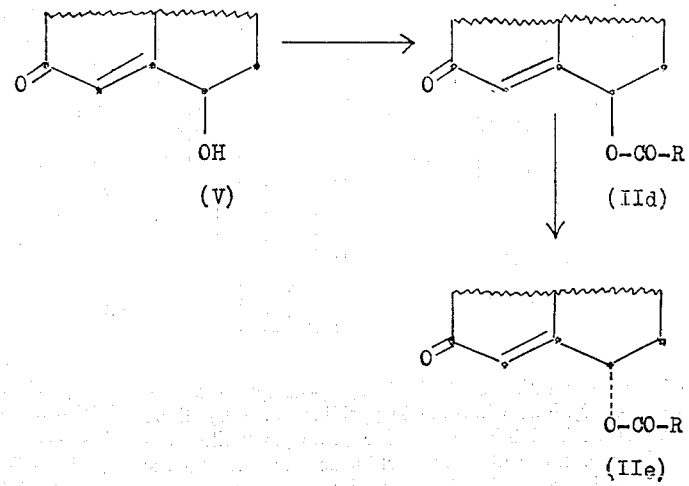

wherein R has the same significance as designated above.

In this procedure, the 3-oxo-Δ⁴-6β-hydroxysteroid having the partial structure of Formula V, which is produced by subjecting the corresponding 3-oxo-Δ⁴-steroid to enoletherification or enolesterification in a conventional manner and reacting the resultant enolether or enolester with per acid such as monoperphthalic acid, is treated with alkanoic anhydride (e.g. acetic anhydride, propionic anhydride, butyric anhydride) in the presence of an organic base (e.g. pyridine, picoline, dimethylaniline, triethylamine) usually at room temperature (10 to 30° C.) for several to several tens hours whereby the 3-oxo-Δ⁴-6β-acyloxysteroid having the partial structure of Formula IId is produced. The thus-produced 6β-isomer can be easily converted into the corresponding 6α-isomer, i.e. the 3-oxo-Δ⁴-6α-acyloxysteroid having the partial structure of Formula IIe, by treating the former with an acid (e.g. hydrochloric acid, hydrobromic acid, sulfuric acid, phosphoric acid, methanesulfonic acid, p-toluenesulfonic acid, formic acid, acetic acid) in a suitable solvent (e.g. acetic acid, dimethylformamide, methylsuccinimide, acetone, dioxane, tetrahydrofuran) from about 0 to about 30° C. for a wide range of period from few minutes to several tens hours.

The following examples set forth illustratively presently-preferred embodiments of the invention. In the examples, abbreviations each has conventional significance: e.g., g., gram(s); ml., millilitre(s); ° C., degrees centigrade; Anal. Calcd., analysis calculated.

EXAMPLE 1

*Preparation of 5′-methylthieno[4′,3′,2′-4,5,6]-5-androstene-3,17-dione*

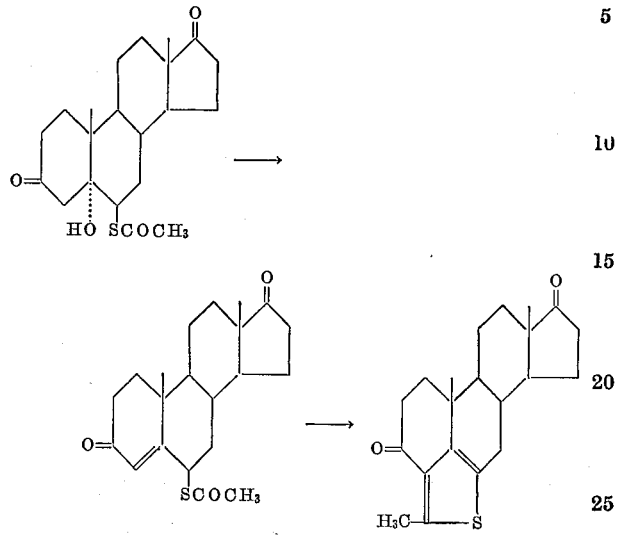

(A) To a solution of 5α-hydroxy-6β-acetylthio-5α-androstane-3,17-dione (2.00 g.) in pyridine (60 ml.), there is dropwise added thionyl chloride (1.00 g.) while cooling with a mixture of sodium chloride and ice, and the resultant mixture is stirred for 10 minutes under the same condition. After decomposition of excess of the reagent with ice, the reaction mixture is shaken with ether. The ether layer is separated, washed with water and dried. After removal of the solvent, the residue is crystallized from a mixture of acetone and hexane to give 6β-acetylthio-4-androstene-3,17-dione (1.42 g.) as crystals melting at 170 to 171° C. $[\alpha]_D^{23}$ +298.8±2° (C.=1.005, chloroform).

UV-spectrum: $\lambda_{max}^{ethanol}$ 237 mμ (ε: 15,820). IR-spectrum: $\nu_{max}^{chloroform}$ cm.$^{-1}$:1737, 1689, 1678, 1617, 1117.

*Analysis.*—Calcd. for $C_{21}H_{28}O_3S$: C, 69.96; H, 7.83; S, 8.89. Found: C, 70.30; H, 7.97; S, 8.82.

(B) 6β-acetylthio-4-androstene-3,17-dione (1.00 g.) is chromatographed on alumina (20 g.). The fractions eluated with petroleum ether-benzene (1:1) and benzene are combined together, concentrated to dryness and crystallized from ether to give 5′-methylthieno[4′,3′,2′-4,5,6]-5-androstene-3,17-dione (0.67 g.) as crystals melting at 234 to 235° C. $[\alpha]_D^{24}$ +38.9±2° (C.=1.027, chloroform).

UV-spectrum: $\lambda_{max}^{ethanol}$ mμ: 221 (ε: 13,730), 268.5 (ε: 12,240), 304 (shoulder; ε: 2,710). IR-spectrum: $\nu_{max}^{chloroform}$ cm.$^{-1}$: 1735, 1664, 1573, 1493.

*Analysis.*—Calcd. for $C_{21}H_{26}O_2S$: C, 73.64; H, 7.65; S, 9.36. Found: C, 73.75; H, 7.68; S, 9.35.

The starting material of this example, 5α-hydroxy-6β-acetylthio-5α-androstane-3,17-dione, is prepared from 5α,6α-epoxy-5α-androstane-3,17-dione [Campbell et al.: J. Am. Chem. Soc., vol. 80, p. 4717 (1958)] according to the following scheme:

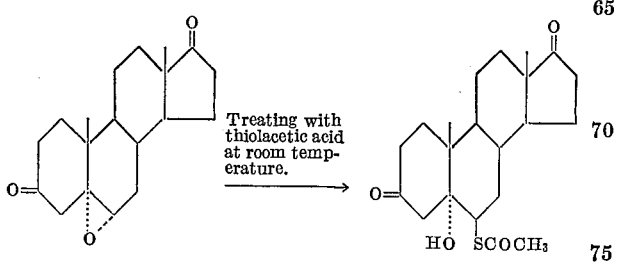

EXAMPLE 2

*Preparation of 5′-methylthieno[4′,3′,2′-4,5,6]-5-androstene-3,17-dione*

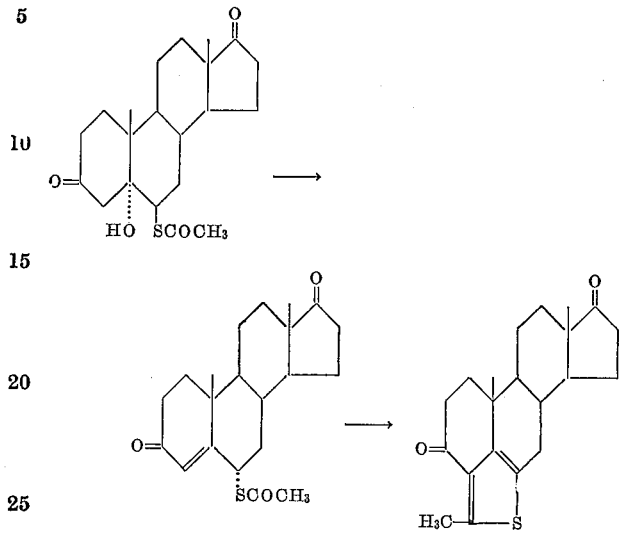

(A) To a solution of 5α-hydroxy-6β-acetylthio-5α-androstane-3,17-dione (059 g.) in glacial acetic acid (20 ml.), dry hydrogen chloride is passed through for 45 minutes. The reaction mixture is combined with water and extracted with ether. The ether extract is washed with water and the solvent evaporated to give 6α-acetylthio-4-androstene-3,17-dione (0.55 g.) as a crude oil.

IR-spectrum: $\nu_{max}^{chloroform}$ cm.$^{-1}$: 1736, 1688, 1679, 1616, 1125.

(B) 6α-acetylthio-4-androstene-3,17-dione (0.55 g.) is chromatographed on alumina (10 g.). The fractions eluated with petroleum ether-benzene (1:1) and benzene are combined together, concentrated to dryness and crystallized from acetone to give 5′-methylthieno[4′,3′,2′-4,5,6]-5-androstene-3,17-dione (0.19 g.) as crystals melting at 234 to 235° C.

EXAMPLE 3

*Preparation of 5′-methylthieno[4′,3′,2′-4,5,6]-5-androstene-3,17-dione*

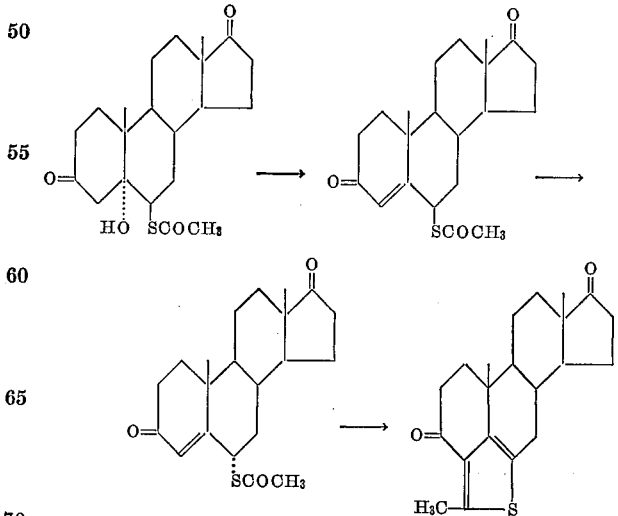

(A) 5α-hydroxy-6β-acetylthio-5α-androstane-3,17-dione is reacted with thionyl chloride in pyridine as in Example 1(A) whereby 6β-acetylthio-4-androstene-3,17-dione is produced.

(B) A mixture of 6β-acetylthio-4-androstene-3,17-dione (1.24 g.), glacial acetic acid (25 ml.) and p-toluenesulfonic acid monohydrate (0.21 g.) is allowed to stand at room temperature (10 to 30° C.) for 48 hours. The reaction mixture is combined with water and shaken with ether. The ether layer is separated, washed with water, dilute sodium carbonate solution and water in order and dried over anhydrous sodium sulfate. After removal of the solvent by evaporation, the residue is chromatographed on activated magnesium silicate. The middle fraction eluated with petroleum ether-benzene is concentrated to give 6α-acetylthio-4-androstene-3,17-dione (0.68 g.) as a crude oil.

(C) 6α-acetylthio-4-androstene-3,17-dione is treated with alumina as in Example 2(B) whereby 5′-methylthieno[4′,3′,2′-4,5,6]-5-androstene-3,17-dione is produced.

EXAMPLE 4

Preparation of 17β-acetyloxy-5′-methylthieno[4′,3′,2′-4,5,6]-5-androsten-3-one and 17β-hydroxy-5′-methylthieno[4′,3′,2′-4,5,6]-5-androsten-3-one

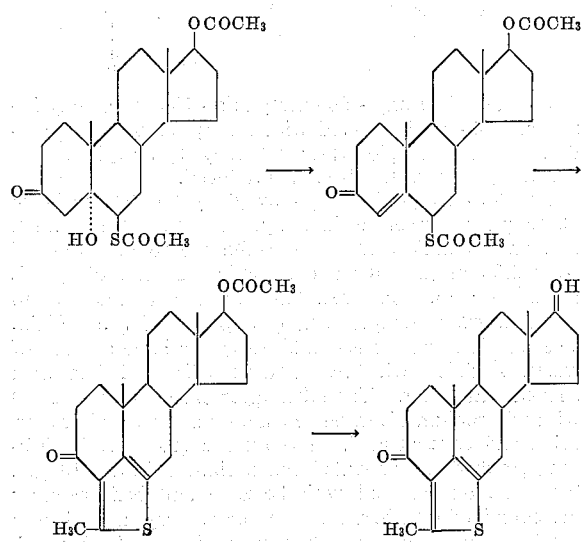

(A) To a solution of 5α-hydroxy-6β-acetylthio-17β-acetyloxy-5α-androstan-3-one (6.53 g.) in pyridine (65 ml.), there is dropwise added thionyl chloride (4 ml.) while stirring at 0° C. After 5 minutes, the reaction mixture is poured into a mixture of ice and water and then shaken with chloroform. The chloroform layer is separated, washed with dilute hydrochloric acid solution and water in order and dried. After removal of the solvent by evaporation, the residue (4.75 g.) is crystallized from a mixture of acetone and hexane to give crystals (2.55 g.). The mother liquor of crystallization is concentrated and chromatographed on activated magnesium silicate. From the eluates with benzene and benzene-ether, there are obtained additional crystals (0.21 g.). The crystals are combined together and recrystallized from the mixture of ether and petroleum ether to give 6β-acetylthio-17β-acetyloxy-4-androsten-3-one (2.59 g.) as pure crystals melting at 144 to 145° C. $[\alpha]_D^{24}$ +186.5±2° (C.=1.026, chloroform).

UV-spectrum: $\lambda_{max.}^{ethanol}$ 237 mμ (ε: 15,960). IR-spectrum: $\nu_{max.}^{CCl_4}$ cm.⁻¹: 1740, 1698, 1683, 1614, 1243, 1132, 1046, 1040.

Analysis.—Calcd. for $C_{23}H_{32}O_4S$: C, 68.28; H, 7.97; S, 7.93. Found: C, 68.54; H, 8.04; S, 7.82.

(B) 6β-acetylthio-17β-acetyloxy-4-androsten-3-one (0.52 g.) is chromatographed on alumina (10 g.). The fractions eluated with petroleum ether-benzene (1:1) and benzene are combined together, concentrated and crystallized from a mixture of acetone and hexane to give 17β-acetyloxy-5′-methylthieno[4′,3′,2′-4,5,6]-5-androsten-3-one (0.23 g.) as crystals melting at 147 to 148° C. $[\alpha]_D^{21}$ −33.0±2° (C.=1.047, chloroform).

UV-spectrum: $\lambda_{max.}^{ethanol}$ mμ: 221 (ε: 12,900), 268.5 (ε: 12,740), 304 (ε: 2,440).

Analysis.—Calcd. for $C_{23}H_{30}O_3S$: C, 71.46; H, 7.82; S, 8.30. Found: C, 71.26; H, 7.97; S, 8.59.

(C) 17β-acetyloxy-5′-methylthieno[4′,3′,2′-4,5,6]-5-androsten-3-one (0.22 g.) is combined with potassium carbonate (0.30 g.) and 80% aqueous methanol (25 ml.), and the resultant mixture is refluxed for 2 hours. The reaction mixture is concentrated under reduced pressure and combined with water. The separated crystals are collected by filtration and recrystallized from a mixture of acetone and hexane to give 17β-hydroxy-5′-methylthieno[4′,3′,2′-4,5,6]-5-androsten-3-one (0.13 g.) as crystals melting at 208 to 210° C. $[\alpha]_D^{24}$ −27.4° (C.=1.067, ethanol).

UV-spectrum: $\lambda_{max.}^{ethanol}$ mμ: 221 (ε: 12,550), 268.5 (ε: 11,740), 304 (ε: 2,360). IR-spectrum: $\nu_{max.}^{chloroform}$ cm.⁻¹: 3620, 3354, 1665, 1573, 1494, 1051.

Analysis.—Calcd. for $C_{21}H_{28}O_2S$: C, 73.21; H, 8.19; S, 9.31. Found: C, 73.30; H, 8.15; S, 9.35.

The starting material of this example, 5α-hydroxy-6β-acetylthio-17β-acetyloxy-5α-androstan-3-one, is prepared from 3,3-ethylenedioxy-5α,6α-epoxy-17β-acetyloxy-5α-androstane [Ringold et al.: Tetrahedron, vol. 7, p. 138 (1959)] according to the following scheme:

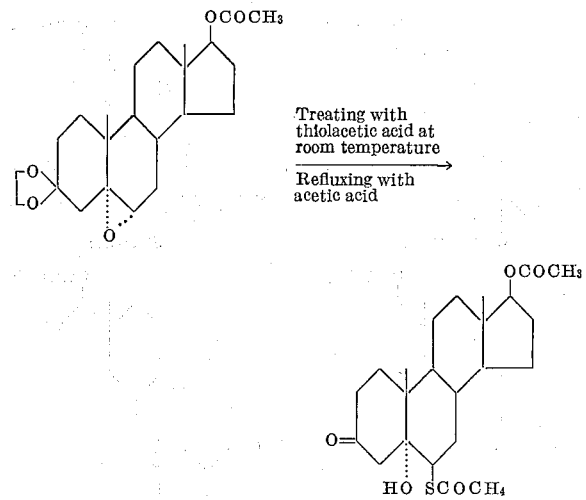

EXAMPLE 5

Preparation of 17β-acetyloxy-5′-methylthieno[4′,3′,2′-4,5,6]-5-androsten-3-one

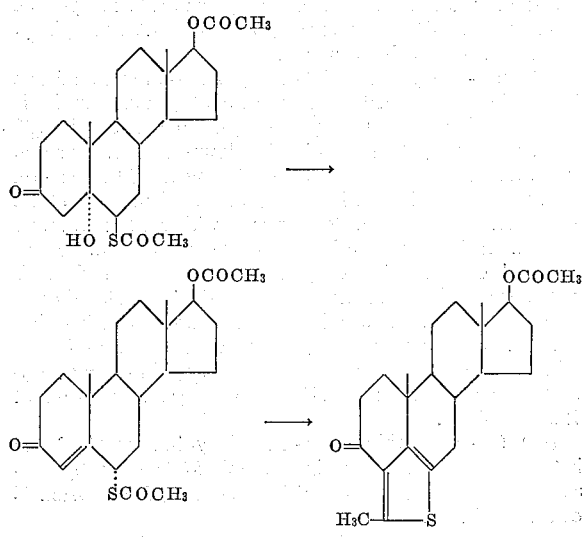

(A) To a solution of 5α-hydroxy-6β-acetylthio-17β-acetyloxy-5α-androstan-3-one (1.00 g.) in glacial acetic acid (30 ml.), dry hydrogen chloride is passed through for 1 hour. The reaction mixture is combined with water and extracted with ether. The ether extract is washed with water and the solvent evaporated. The residue (0.93 g.) is chromatographed on activated magnesium silicate (30 g.). The fractions eluated with benzene and benzene-ether (9:1–8:2) are combined together, concentrated and crystallized from methanol to give 6α-acetylthio-17β-acetyloxy-4-androsten-3-one (0.50 g.) as crystals melting at 192 to 194° C. $[\alpha]_D^{22.5}$ +40.3±2° (C.=1.016, chloroform).

UV-spectrum: $\lambda_{max.}^{ethanol}$ 235 mμ (ε: 16,820). IR-spectrum: $\nu_{max.}^{CCl_4}$ cm.$^{-1}$: 1741, 1687, 1618, 1244, 1134, 1044, 1016.

Analysis—Calcd. for $C_{23}H_{32}O_4S$: C, 68.28; H, 7.97; S, 7.93. Found: C, 68.39; H, 8.10; S, 7.89.

(B) 6α - acetylthio - 17β - acetyloxy-4-androsten-3-one (1.00 g.) is chromatographed on alumina (30 g.) and treated as in Example 4(B) to give 17β-acetyloxy-5′-methylthieno[4′,3′,2′-4,5,6]-5-androsten-3-one (0.60 g.) as crystals melting at 147 to 148° C.

EXAMPLE 6

Preparation of 17β-acetyloxy-5′-methylthieno[4′,3′,2′-4,5,6]-5-androsten-3-one

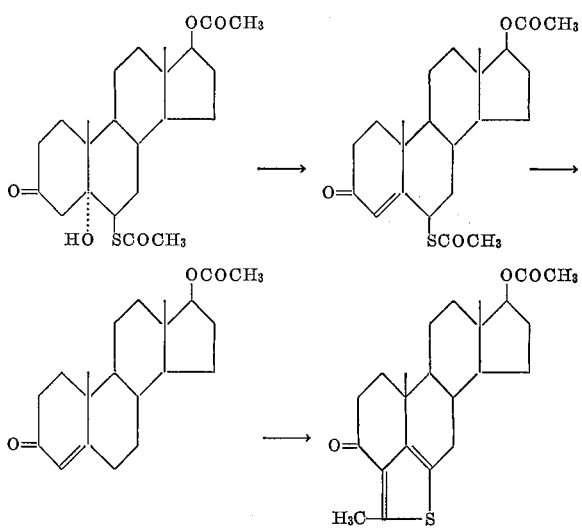

(A) 5α - hydroxy - 6β - acetylthio-17β-acetyloxy-5α-androstan-3-one is reacted with thionyl chloride in pyridine as in Example 4(A) whereby 6β-acetylthio-17β-acetyloxy-4-androsten-3-one is produced.

(B) 6β - acetylthio - 17β - acetyloxy-4-androsten-3-one (2.76 g.) is dissolved in a mixture of p-toluenesulfonic acid monohydrate (0.60 g.) and glacial acetic acid (30 ml.), and the resultant solution is allowed to stand at room temperature (10 to 30° C.) for 48 hours. The reaction mixture is combined with water and shaken with ether. The ether layer is separated, washed with water and dilute sodium carbonate solution in order and dried. After removal of the solvent by evaporation, the residue is chromatographed on activated magnesium silicate (60 g.). The fractions eluated with benzene and benzene-ether (9:1–4:1) are combined together, concentrated and crystallized from methanol to give 6α-acetylthio-17β-acetyloxy-4-androsten-3-one (1.15 g.) as crystals melting at 192 to 194° C.

(C) 6α - acetylthio - 17β - acetyloxy-4-androsten-3-one is treated with alumina as in Example 5(B) whereby 17β-acetyloxy - 5′ - methylthieno[4′,3′,2′-4,5,6]-5-androsten-3-one is produced.

EXAMPLE 7

Preparation of 17β-hydroxy-5′-methylthieno[4′,3′,2′-4,5,6]-5-androsten 3-one

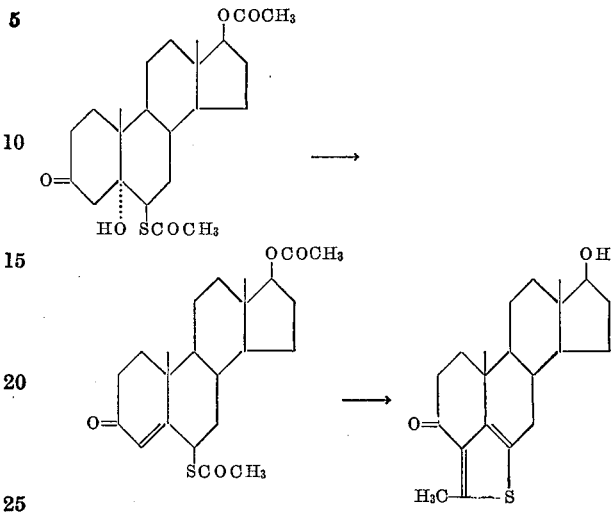

(A) 5α - hydroxy - 6β - acetylthio - 17β - acetyloxy-5α-androsten-3-one is reacted with thionyl chloride in pyridine as in Example 4(A) whereby 6β-acetylthio-17β-acetyloxy-4-androsten-3-one is produced.

(B) 6β - acetylthio - 17β - acetyloxy-4-androsten-3-one (0.49 g.) is dissolved in anhydrous ethanol (15 ml.), and an ethanolic solution of sodium ethoxide prepared from ethanol (20 ml.) and metallic sodium (1.00 g.) is added thereto. The resultant mixture is allowed to stand at room temperature (10 to 30° C.) overnight. The reaction mixture is combined with a large amount of water, acidified with 5% hydrochloric acid and then shaken with ether. The ether layer is separated, washed with 5% sodium bicarbonate solution and water in order, dried and concentrated. The residue (0.41 g.) is chromatographed on activated magnesium silicate (10 g.). The fractions eluated with benzene and benzene-ether are combined tobether, concentrated and crystallized from a mixture of acetone and hexane to give 17β-hydroxy-5′-methylthieno[4′,3′,2′-4,5,6]-5-androsten-3-one (0.24 g.) as crystals melting at 208 to 210° C.

EXAMPLE 8

Preparation of 5′-methylthieno[4′,3′,2′-4,5,6]-5-cholesten-3-one

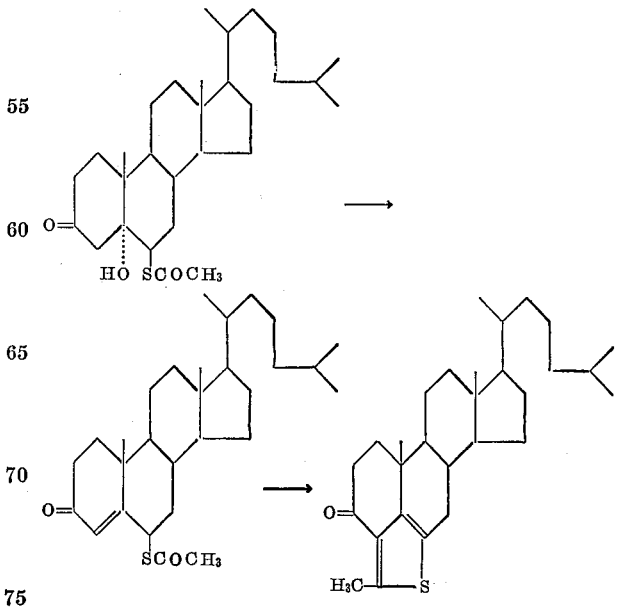

(A) To a solution of 5α-hydroxy-6β-acetylthio-5α-cholesten-3-one (1.44 g.) in pyridine (14 ml.), there is dropwise added thionyl chloride (0.70 ml.) at 0° C. while stirring. After 10 minutes, the reaction mixture is poured into a mixture of ice and water and shaken with a mixture of ether and benzene. The organic solvent layer is washed with water, dried and concentrated. The resultant oil (1.15 g.) is crystallized from petroleum ether and recrystallized from methanol to give 6β-acetylthio-4-cholesten-3-one (0.92 g.) as crystals melting at 106 to 107° C. $[\alpha]_D^{29}$ +168.5±3° (C.=0.874, chloroform).

UV-spectrum: $\lambda_{max}^{ethanol}$ 240 m$\mu$ ($\epsilon$: 15,320). IR-spectrum: $\nu_{max}^{Nujol}$ cm.$^{-1}$: 1693, 1672, 1612, 1124

Analysis. Calcd. for $C_{29}H_{46}O_2S$: C, 75.93; H, 10.11; S, 6.99. Found: C, 76.13; H, 10.20; S, 6.93.

(B) To a solution of 6β-acetylthio-4-cholesten-3-one (0.26 g.) in ethanol (20 ml.), there is added an ethanolic solution of sodium ethoxide prepared from metallic sodium (0.50 g.) and anhydrous ethanol (10 ml.), and the resultant mixture is allowed to stand at room temperature (10 to 30° C.). The reaction mixture is poured into water, acidified with 5% hydrochloric acid and shaken with ether. The ether layer is washed with 5% sodium bicarbonate solution and water in order, dried and concentrated. The residue is chromatographed on activated magnesium silicate. The fraction eluated with benzene is concentrated and crystallized from a mixture of ether and methanol to give 5'-methylthieno[4',3',2'-4,5,6]-5-cholesten13-one (0.13 g.) as crystals melting at 130 to 132° C. $[\alpha]_D^{29}$ −11±3° (C.=0.866, chloroform).

UV-spectrum: $\lambda_{max}^{ethanol}$ m$\mu$: 221 ($\epsilon$: 12,630), 269 ($\epsilon$: 11,470), 305 ($\epsilon$: 2,280). IR-spectrum: $\nu_{max}^{chloroform}$ cm.$^{-1}$: 1658, 1574, 1493

Analysis.—Calcd. for $C_{29}H_{44}OS$: C, 79.04; H, 10.07; S, 7.28. Found: C, 79.81; H, 10.03; S, 7.40.

The starting material of this example, 5α-hydroxy-6β-acetylthio-5α-cholestan-3-one, is known [Komeno: Chem. Pharm. Bull., Japan, vol. 8, p. 672 (1960)].

EXAMPLE 9

Preparation of 5'-methylthieno[4',3',2'-4,5,6]-5-cholesten-3-one

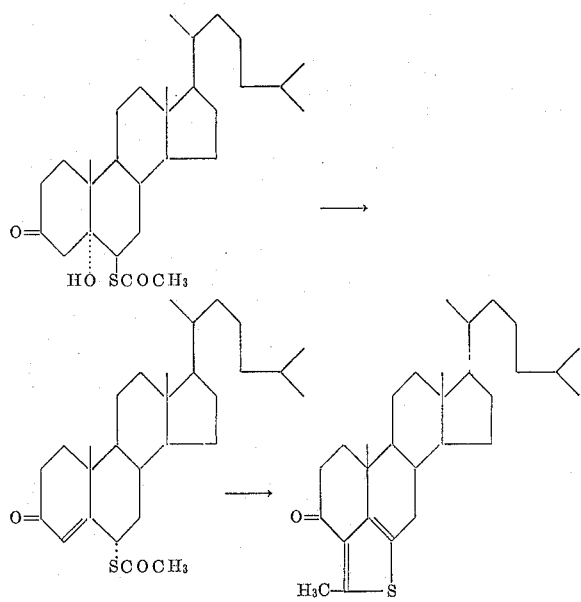

(A) To a solution of 5α-hydroxy-6β-acetylthio-5α-cholestan-3-one (0.32 g.) in glacial acetic acid (15 ml.), there is added p-toluenesulfonic acid monohydrate (0.10 g.), and the resultant mixture is allowed to stand at room temperature (10 to 30° C.) overnight. The reaction mixture is combined with water and shaken with a mixture of ether and benzene. The organic solvent layer is washed with water and dilute sodium carbonate solution in order, dried and concentrated. The resultant oil is purified on chromatography with activated magnesium silicate whereby 6α-acetylthio-4-cholesten-3-one (0.23 g.) is obtained as an oil.

UV-spectrum: $\lambda_{max}^{ethanol}$ 235 m$\mu$ (B) 6α-acetylthio-4-chloesten-3-one (2.35 g.) is chromatographed on alumina (90 g.). The fraction eluated with petroleum ether-benzene (4:1) is concentrated, crystallized from methanol and recrystallized from a mixture of ether and methanol to give 5'-methylthieno-[4',3',2'-4,5,6]-5-cholesten-3-one (1.45 g.) as crystals melting at 131 to 132° C.

EXAMPLE 10

Preparation of 5'-methylthieno[4',3',2'-4,5,6]-5-cholesten-3-one

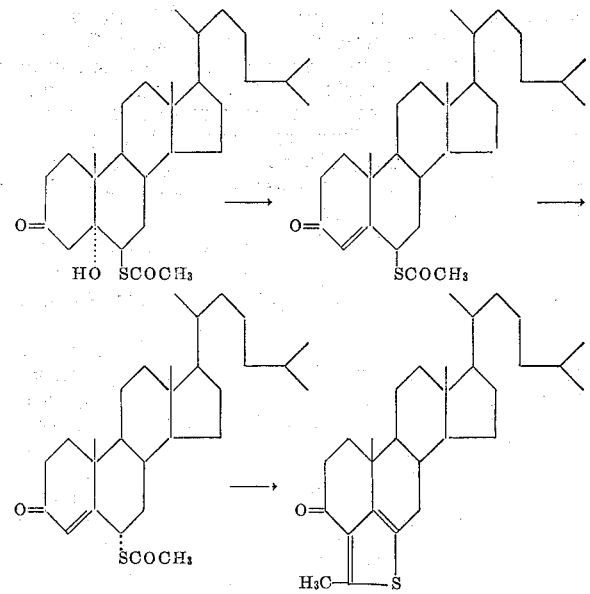

(A) 5α-hydroxy-6β-acetylthiocholestan-3-one is reacted with thionyl chloride in pyridine as in Example 8(A) whereby 6β-acetylthio-4-cholesten-3-one is produced.

(B) To a solution of 6β-acetylthio-4-cholesten-3-one (0.10 g.) in glacial acetic acid (10 ml.), there is added p-toluenesulfonic acid monohydrate (0.05 g.), and the resultant mixture is allowed to stand at room temperature (10 to 30° C.) overnight. The reaction mixture is shaken with a mixture of ether and benzene. The organic solvent layer is washed with water and dilute sodium carbonate solution in order, dried and concentrated. The resultant oil is chromatographed on activated magnesium silicate for purification to give 6α-acetylthio-4-cholesten-3-one (0.08 g.) as an oil.

(C) 6α-acetylthio-4-cholesten-3-one is treated with alumina as in Example 9(B) whereby 5'-methylthieno-[4',3',2'-4,5,6]-5-cholesten-3-one is produced.

EXAMPLE 11

Preparation of 5'-methylthieno[4',3',2'-4,5,6]-5-pregene-3,20-dione

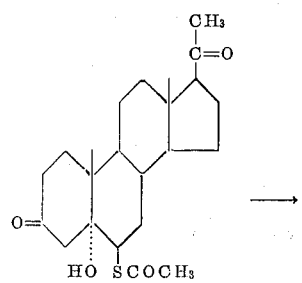

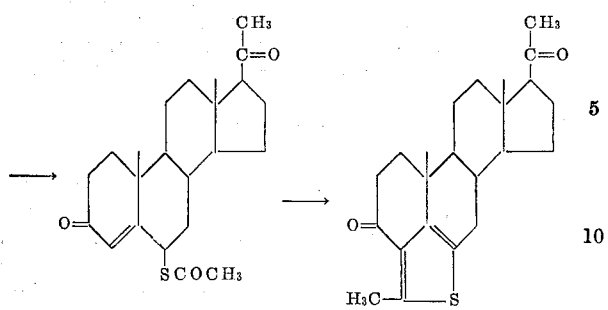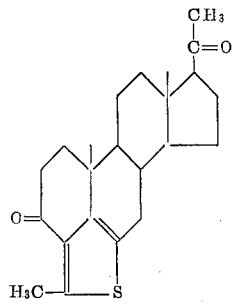

(A) To a solution of 5α-hydroxy-6β-acetylthio-5α-pregnane-3,20-dione (2.00 g.) in pyridine (20 ml.), there is dropwise added thionyl chloride (1 ml.), and the resultant mixture is stirred for 5 minutes at 0° C. The reaction mixture is poured into a mixture of ice and water and shaken with chloroform. The chloroform layer is washed with water, dried and concentrated to dryness. The residue is crystallized from methanol to give 6β-acetylthio-4-pregnene-3,20-dione (1.25 g.) as crystals melting at 185 to 187° C. $[\alpha]_D^{25}$ +243 ±2° (C.=1.060, chloroform).

UV-spectrum: $\lambda_{max.}^{ethanol}$ 238 mμ (ε: 15,140). IR-spectrum: $\nu_{max.}^{"Nujol"}$ cm.$^{-1}$: 1695, 1660, 1611, 1118.

Analysis.—Calcd. for $C_{23}H_{32}O_3S$: C, 71.09; H, 8.30; S, 8.25. Found: C, 71.54; H, 8.46; S, 8.07.

(B) 6β-acetylthio-4-pregnene-3,20-dione (0.50 g.) is dissolved into a mixture of p-toluenesulfonic acid monohydrate (0.10 g.) and glacial acetic acid (10 ml.), and the resultant mixture is allowed to stand at room temperature (10 to 30° C.) overnight. The reaction mixture is combined with water and shaken with ether. The ether layer is separated, washed with water, dilute sodium carbonate solution and water in order, dried and concentrated. The residue is crystallized from methanol to recover the unchanged starting material (0.17 g.). The mother liquor of crystallization is chromatographed on alumina. The fraction eluated with benzene-ether (9:1–8:2) is concentrated and crystallized from methanol to give 5'-methylthieno[4',3',2'-4,5,6]-5-pregnene-3,20-dione (0.19 g.) as crystals melting at 163 to 164° C. $[\alpha]_D^{30}$ +38.1±3° (C.=0.862, chloroform).

UV-spectrum: $\lambda_{max.}^{ethanol}$ mμ: 221 (ε: 13,480), 268 (ε: 12,370), 302 (ε: 2,670). IR-spectrum: $\nu_{max.}^{chloroform}$cm.$^{-1}$: 1696, 1663, 1570, 1491.

Analysis.—Calcd. for $C_{23}H_{30}O_2S$: C, 74.55; H, 8.16; S, 8.65. Found: C, 74.81; H, 8.11; S, 8.99.

The starting material of this example, 5α-hydroxy-6β-acetylthio-5α-pregnane-3,20-dione, is known [Komeno: U.S. Patent 3,047,590].

EXAMPLE 12

Preparation of 5'-methylthieno[4',3',2'-4,5,6]-5-pregnene-3,20-dione

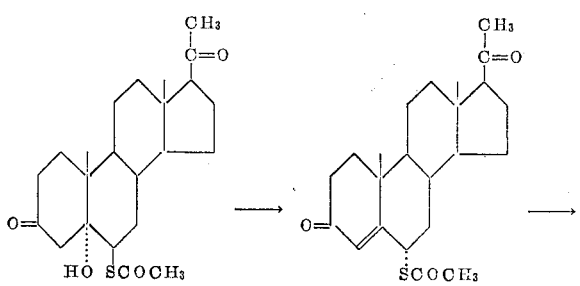

(A) To a solution of 5α-hydroxy-6β-acetylthio-5α-pregnane-3,20-dione (0.30 g.) in glacial acetic acid (15 ml.), dry hydrogen chloride is passed through for 1 hour. The resulting mixture is allowed to stand at room temperature (10 to 30° C.) overnight. The reaction mixture is combined with water and shaken with ether. The ether layer is separated, washed with water, dilute sodium carbonate solution and water in order, dried and concentrated to give 6α-acetylthio-4-pregnene-3,20-dione (0.24 g.) as a crude oil.

UV-spectrum: $\lambda_{max.}^{ethanol}$ 236 mμ.

(B) 6α-acetylthio-4-pregnene-3,20-dione (0.24 g.) is chromatographed on alumina (7 g.). The fraction eluated with benzene is concentrated and crystallized from methanol to give 5'-methylthieno[4',3',2'-4,5,6]-5-pregnene-3,20-dione (0.10 g.) as crystals melting at 163 to 164° C.

EXAMPLE 13

Preparation of 5'-methylthieno[4',3',2'-4,5,6]-5-pregnene-3,20-dione

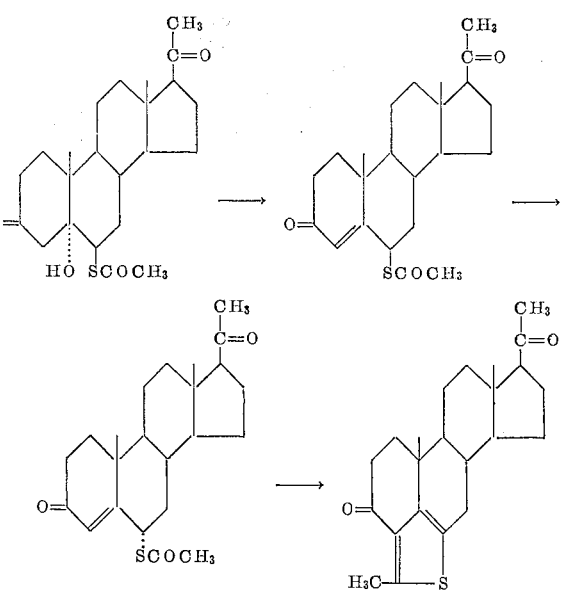

(A) 5α-hydroxy-6β-acetylthio-5α-pregnane-3,20-dione is reacted with thionyl chloride in pyridine as in Example 11(A) whereby 6β-acetylthio-4-pregnene-3,20-dione is produced.

(B) To a solution of 6β-acetylthio-4-pregnene-3,20-dione (1.02 g.) in glacial acetic acid (30 ml.), dry hydrogen chloride is passed through for 30 minutes. The reaction mixture is combined with water and shaken with ether. The ether layer is separated, washed with water, dilute sodium carbonate solution and water, dried and concentrated to give 6α-acetylthio-4-pregnene-3,20-dione (0.88 g.) as an oil.

(C) 6α-acetylthio-4-pregnene-3,20-dione is treated with alumina as in Example 12 (B) whereby 5'-methylthieno [4',3',2'-4,5,6]-5-pregnene-3,20-dione is produced.

EXAMPLE 14

*Preparation of 5'-methylthieno[4',3',2'-4,5,6]-5-pregnene-3,20-dione*

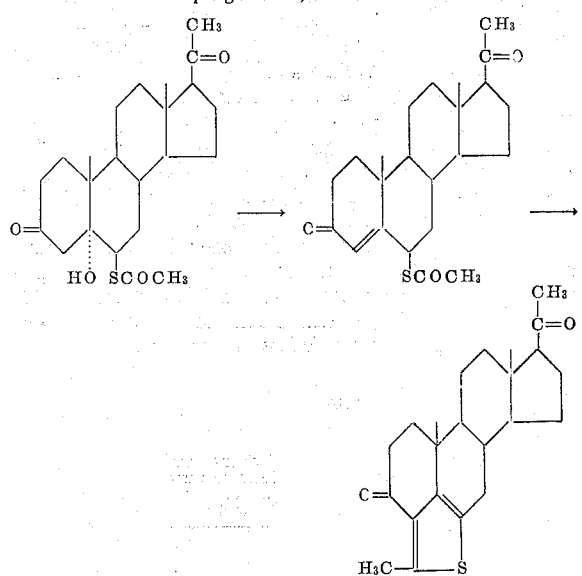

(A) 5α-hydroxy-6β-acetylthio-5α-pregnane-3,20-dione is reacted with thionyl chloride in pyridine as in Example 11 (A) whereby 6β-acetylthio-4-pregnene-3,20-dione is produced.

(B) 6β-acetylthio-4-pregnene-3,20-dione (0.20 g.) is dissolved in ethanol (10 ml.), and an ethanolic solution of sodium ethoxide prepared from metallic sodium 0.44 g.) and ethanol (8 ml.) is added thereto. The resulting mixture is allowed to stand at room temperature (10 to 30° C.) overnight. The reaction mixture is combined with water, acidified with 5% hydrochloric acid and shaken with ether. The ether layer is separated, washed with 5% sodium bicarbonate solution and water in order, dried over sodium sulfate and then concentrated. The residue is chromatographed on activated magnesium silicate (8 g.). The fraction eluated with benzene-ether (9:1-8:2) is concentrated and crystallized from methanol to give 5'-methylthieno[4',3',2'-4,5,6]-5-pregnene-3,20-dione (0.04 g.) as crystals melting at 163 to 164° C.

EXAMPLE 15

*Preparation of 17α-hydroxy-5'-methylthieno[4',3',2'-4,5,6]-5-pregnene-3,20-dione and 17α-acetyloxy-5'-methylthieno-[4',3',2'-4,5,6]-5-pregnene-3,20-dione*

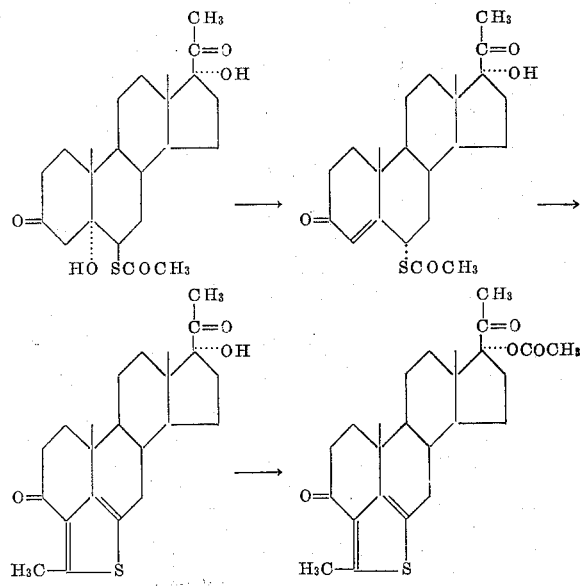

(A) To a solution of 5α,17α-dihydroxy-6β-acetylthio-5α-pregnane-3,20-dione (0.83 g.) in glacial acetic acid (15 ml.), dry hydrogen chloride is passed through for 20 minutes while cooling with ice, and the resultant mixture is allowed to stand for 10 minutes under the same condition. The reaction mixture is combined with water and shaken with ether. The ether layer is separated, washed with water, dilute sodium carbonate solution and water in order, dried over anhydrous sodium sulfate and concentrated to dryness to give 6α-acetylthio-17α-hydroxy-4-pregnene-3,20-dione (0.81 g.) as an oil.

(B) 6α-acetylthio-17α-hydroxy-4-pregnene-3,20-dione (0.81 g.) is dissolved in anhydrous ethanol (40 ml.), and an ethanolic solution of sodium ethoxide prepared from metallic sodium (1.80 g.) and ethanol (1.1 ml.) is added thereto. The resultant mixture is allowed to stand at room temperature (10 to 30° C.) overnight. The reaction mixture is combined with water and shaken with chloroform. The chloroform layer is separated, washed with dilute hydrochloric acid and water in order, dried over anhydrous sodium sulfate and concentrated. The residue is purified on chromatography with activated magnesium silicate and crystallized from methanol to give 17α-hydroxy-5'-methylthieno[4',3',2'-4,5,6]-5-pregnene-3,20-dione (0.36 g.) as crystals melting at 240 to 242° C. $[\alpha]_D^{24}$ —47.8±2° (C.=0.995, chloroform).

UV-spectrum: $\lambda_{max.}^{ethanol}$ mμ: 221 (ε: 13,050), 268.5 (ε: 11,860), 304 (ε: 2,430). IR-spectra: $\nu_{max.}^{"Nujol"}$ cm.$^{-1}$: 3494, 1702, 1658, 1571, 1488; $\nu_{max.}^{chloroform}$ cm.$^{-1}$: 3496, 1694, 1660, 1573, 1490. NMR-spectrum: 7.71 τ (21-methyl)

*Analysis.*—Calcd. for $C_{23}H_{30}O_3S$: C, 71.46; H, 7.82; S, 8.30. Found: C, 71.49; H, 7.82; S, 8.35.

(C) 17α-hydroxy-5'-methylthieno[4',3',2',-4,5,6]-5-pregnene-3,20-dione (1.18 g.) is dissolved in a mixture of glacial acetic acid (10 ml.) and acetic anhydride (5 ml.), and p-toluenesulfonic acid (0.12 g.) is added thereto. The resultant mixture is allowed to stand at room temperature (10 to 30° C.) for 48 hours. The reaction mixture is combined with a mixture of ice and water. The precipitate is collected by filtration, washed with water, dried and crystallized from a mixture of acetone and methanol to give 17α-acetyloxy-5'-methylthieno[4',3',2',-4,5,6]-5-pregnene-3,20-dione (1.06 g.) as crystals melting at 267 to 269° C. $[\alpha]_D^{24.5}$ —39.0±2° (C.=0.981, chloroform).

UV-spectrum: $\lambda_{max.}^{ethanol}$ mμ: 221 (ε: 12,390), 268.5 (ε: 11,320), 302 ε: 2,380). IR-spectrum: $\nu_{max.}^{chloroform}$ cm.$^{-1}$: 1729, 1718 (shoulder), 1664, 1574, 1493

*Analysis.*—Calcd. for $C_{25}H_{32}O_4S$: C, 70.06; H, 7.53; S, 7.48. Found: C, 70.08; H, 7.55; S, 7.74.

The starting material of this example, 5α17α-dihydroxy-6β-acetylthio-5α-pregnane-3,20-dione, is prepared from 3,3,20,20-bisethylenedioxy-5α,6α-epoxy-17α-hydroxy-5α,6α-epoxy-17α-hydroxy-5α-pregnane [Babcock et al.: J. Am. Chem. Soc., vol. 80, p. 2904 (1958)] according to the following scheme:

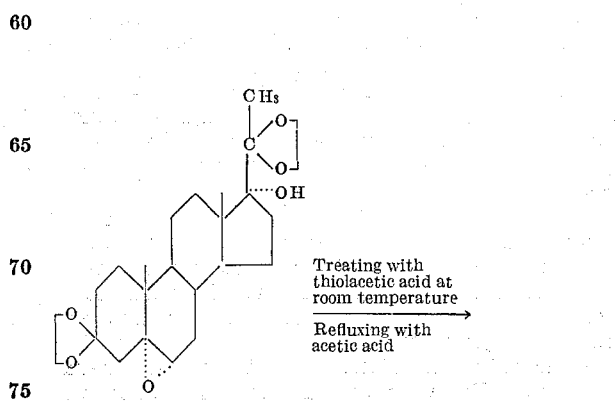

Treating with thiolacetic acid at room temperature

Refluxing with acetic acid

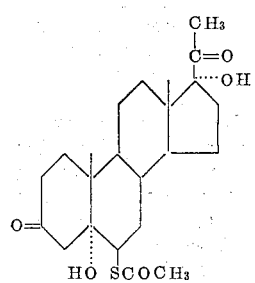

EXAMPLE 16

*Preparation of 17β-hydroxy-17α-ethynyl-5'-methylthieno [4',3',2'-4,5,6]-5-estren-3-one and 17β-acetyloxy-17α-ethynyl - 5' - methylthieno[4',3',2'-4,5,6]-5-estren-3-one*

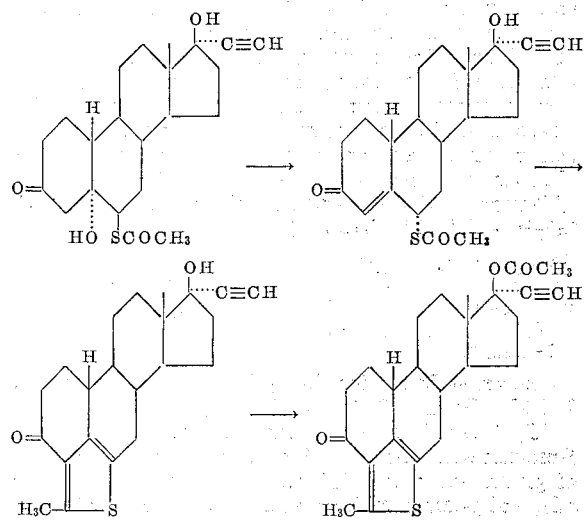

(A) To a solution of 5α,17β-dihydroxy-6β-acetylthio-17α-ethynyl-5α-estran-3-one (0.33 g.) in glacial acetic acid (10 ml.), there is passed through dry hydrogen chloride for 2 hours. The reaction mixture is combined with water and shaken with ether. The ether layer is separated, washed with water, dilute sodium carbonate solution and water in order, dried over anhydrous sodium sulfate and evaporated to dryness to give 6α-acetylthio-17β-hydroxy-17α-ethynyl-4-estren-3-one (0.31 g.) as an oil.

IR–spectra: $\nu_{max.}^{"Nujol"}$ cm.$^{-1}$: 3400, 3275, 1715, 1683, 1618, 1130; $\nu_{max.}^{CCl_4}$ cm$^{-1}$: 3626, 3286, 1700, 1687, 1622, 1130

(B) To a solution of 6α-acetylthio-17β-hydroxy-17α-ethynyl-4-estren-3-one (1.44 g.) in anhydrous ethanol (150 ml.), there is added an ethanolic solution of sodium ethoxide prepared from metallic sodium (0.53 g.) and ethanol (50 ml.), and the resultant mixture is allowed to stand overnight at room temperature (10 to 30° C.). The reaction mixture is combined with water and sodium chloride and shaken with chloroform. The chloroform layer is separated, washed with water, dried over anhydrous sodium sulfate and concentrated. The residue is chromatographed on activated magnesium silicate (60 g.). The fraction eluted with benzene-chloroform (1:1–1:2) is concentrated to give 17β-hydroxy-17α-ethynyl-5'-methyltieno[4',3',2'-4,5,6]-5-estren-3-one (1.73 g.) as an oil.

IR–spectrum: $\nu_{max.}^{chloroform}$ cm.$^{-1}$: 3618, 3274, 1665, 1576, 1493

(C) To a solution of 17β-hydroxy - 17α - ethynyl-5'-methylthieno[4',3',2'-4,5,6]-5-estren-3-one (1.70 g.) in glacial acetic acid (20 ml.), there is added a mixture of acetic anhydride (5 ml.) and p-toluenesulfonic acid monohydrate (0.18 g.), and the resultant mixture is allowed to stand overnight at room temperature (10 to 30° C.). The reaction mixture is combined with water and shaken with ether. The ether layer is separated, washed with water, dried over anhydrous sodium sulfate and concentrated. The residue is chromatographed on alumina (40 g.). The fractions eluted with benzene-petroleum ether (2:1) and benzene are combined together, concentrated and crystallized from methanol to give 17β-acetyloxy-17α-ethynyl - 5' - methylthieno[4',3',2'-4,5,6]-5-estren-3-one (1.37 g.) as crystals melting at 200 to 202° C. (decomp.). $[\alpha]_D^{23}$ —90.4±2° (C.=1.059, chloroform).

UV–spectrum: $\lambda_{max.}^{ethanol}$ mμ: 221.5 (ε: 14,378), 268 (ε: 12,609), 303 (ε: 2,324). IR–spectrum: $\nu_{max.}^{chloroform}$ cm.$^{-1}$: 3308, 1741, 1667, 1575, 1492, 1256, 1034

*Analysis.*—Calcd. for $C_{24}T_{28}O_3S$: C, 72.69; H, 7.12; S, 8.09. Found: C, 72.93; H, 7.17; S, 7.88.

The starting material of this example, 5α,17β-dihydroxy-6β-acetylthio-17α-ethynyl-5α-estran-3-one, is prepared from 5α,6α-epoxy-17α-ethynyl-5α-estrane-3β,17β-diol [Ringold et al.: J. Am. Chem. Soc., vol. 81, p. 436 (1959)] according to the following scheme:

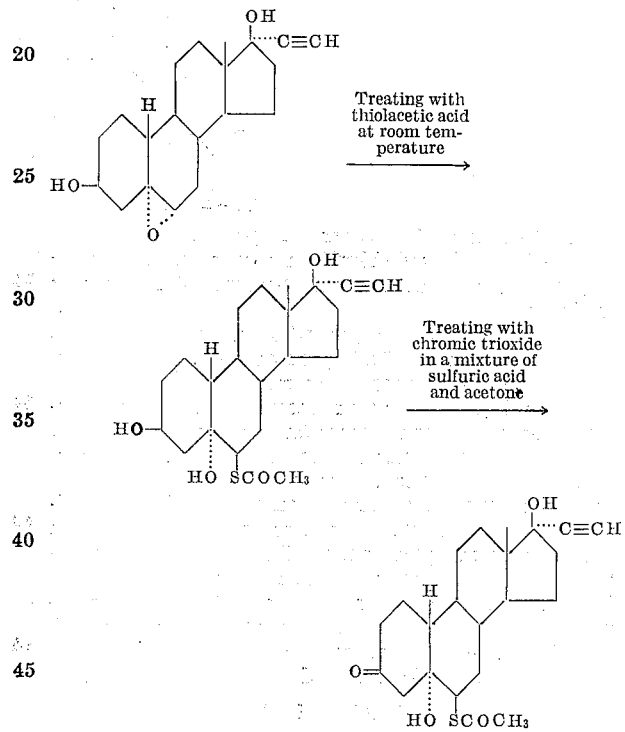

EXAMPLE 17

*Preparation of 5'-methylthieno[4',3',2'-4,5,6]-5-pregnene-3,20-dione*

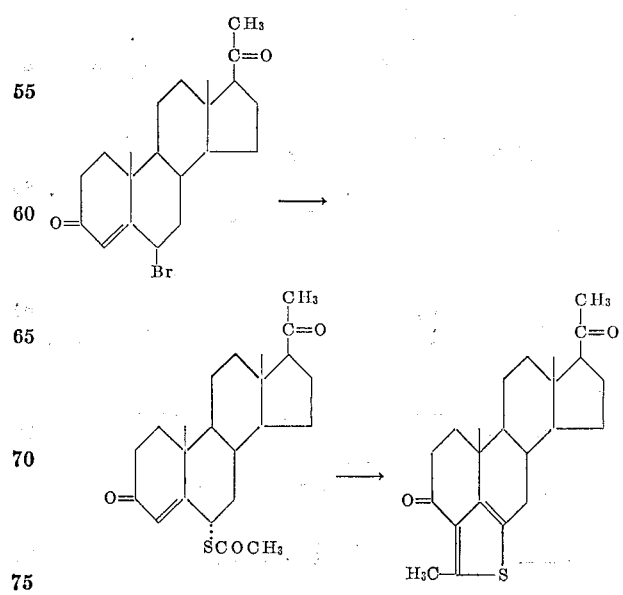

(A) To a solution of 6β-bromoprogestrone (0.56 g.) in acetone (25 ml.), there is added potassium thiolacetate (0.33 g.), and the resultant mixture is stirred for 4 hours at room temperature (10 to 30° C.). The reaction mixture is combined with water and shaken with ether. The ether layer is separated, washed with water, dried and concentrated to give 6α-acetylthio-4-pregnene-3,20-dione (0.45 g.) as an oil.

(B) 6α-acetylthio-4-pregnene-3,20-dione (0.45 g.) is dissolved in toluene (20 ml.), and sodium hydride (0.11 g., 50% in oil) is added thereto. The resultant mixture is refluxed for 4 hours. After cooling, the reaction mixture is combined with water and shaken with ether. The organic solvent layer is separated, washed with water, dried over anhydrous sodium sulfate and concentrated. The residue is crystallized from methanol to give 5'-methylthieno[4',3',2'-4,5,6]-5-pregnene-3,20-dione (0.19 g.) as crystals melting at 163 to 164° C.

The starting material of this Example, 6β-bromoprogesterone, is known [Ringold et al.: U.S. Patent 3,036,096].

EXAMPLE 18

*Preparation of 17β-acetyloxy-5'-methylthieno[4',3',2'-4,5,6]-5-androsten-3-one*

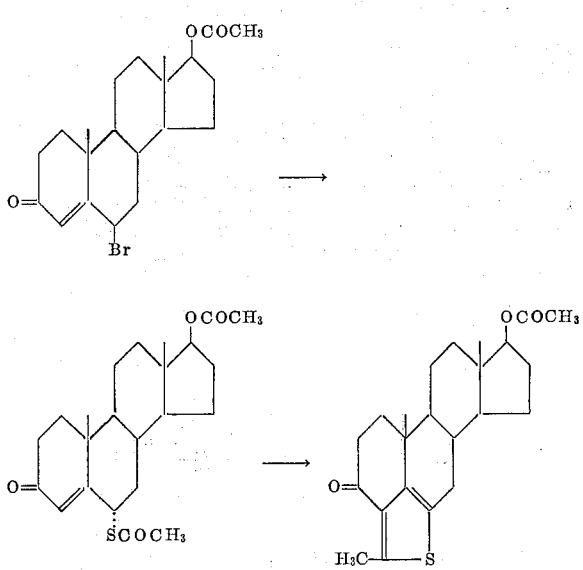

(A) To a solution of 6β-bromo-17β-acetyloxy-4-androsten-3-one (2.24 g.) in acetone (60 ml.), there is added potassium thiolacetate (1.26 g.), and the resultant mixture is stirred for 4 hours at room temperature (10 to 30° C.). The reaction mixture is combined with water and shaken with a mixture of ether and chloroform (4:1). The organic solvent layer is separated, washed with dilute sodium carbonate solution and water in order, dried over anhydrous sodium sulfate and concentrated. The residue is crystallized from a mixture of ether and petroleum ether to give 6α-acetylthio-17β-acetyloxy-4-androsten-3-one (1.37 g.) as crystals melting at 192 to 194° C. The mother liquor of crystallization is purified by chromatography on activated magnesium silicate to give additional crystals (0.27 g.) of the same substance.

(B) 6α - acetylthio - 17β - acetyloxy - 4 - androsten-3-one is treated with alumina as in Example 5(B) whereby 17β - acetyloxy - 5' - methylthieno[4',3',2'-4,5,6]-5-androsten-3-one is produced.

The starting material of this example, 6β-bromo-17β-acetyloxy-4-androsten-3-one, is prepared from testosterone acetate according to the following scheme:

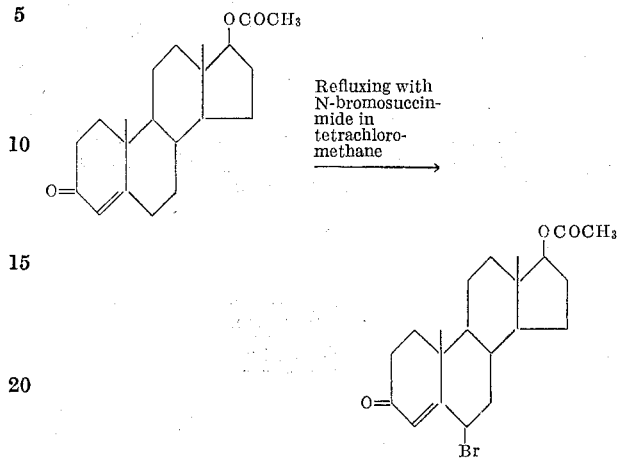

EXAMPLE 19

*Preparation of 17β-propionyloxy-5'-methylthieno[4',3',2'-4,5,6]-5-androsten-3-one*

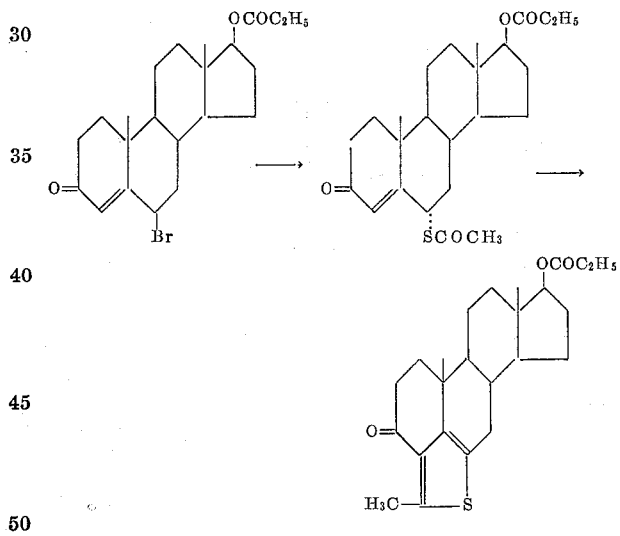

(A) To a solution of 6β-bromo-17β-propionyloxy-4-androsten-3-one (0.93 g.) in dimethylformamide (20 ml.), there is added potassium thiolacetate (0.80 g.), and the resultant mixture is stirred for 30 minutes at room temperature (10 to 30° C.). The reaction mixture is combined with water and shaken with a mixture of ether and dichloromethane (4:1). The organic solvent layer is washed with water, dried over anhydrous sodium sulfate and concentrated. The residue is crystallized from a mixture of ether and petroleum ether and recrystallized from methanol to give 6α-acetylthio-17β-propionyloxy-4-androsten-3-one (0.71 g.) as crystals melting at 151 to 153° C. $[\alpha]_D^{23}$ +40.9±2° (C.=1.006, chloroform).

UV-spectrum: $\lambda_{max}^{ethanol}$ 235 5 mμ (ε: 16,200). IR-spectrum: $\nu_{max}^{Nujol}$ cm.$^{-1}$: 1731, 1696, 1675, 1610, 1190, 1130.

*Analysis.*—Calcd. for $C_{24}H_{34}O_4S$: C, 68.86; H, 8.19; S, 7.66. Found: C, 68.71; H, 8.21; S, 7.79.

(B) 6α - acetylthio - 17β - propionyloxy - 4 - androsten-3-one (0.10 g.) is chromatographed on alumina (8 g.) and eluated with petroleum ether-benzene (1:1) and benzene. The fractions are combined together and concentrated. The residue is crystallized from a mixture of water and methanol to give 17β-propionyloxy-5'-methylthieno[4',3',2'-4',5,6]-5-androsten - 3 - one (0.04 g.) as crystals melting at 111 to 113° C. $[\alpha]_D^{23.5}$ −30.9±2° (C.=1.067, chloroform).

UV-spectrum: $\lambda_{max.}^{ethanol}$ 220.5 ($\epsilon$: 12,520), 268.5 ($\epsilon$: 11,389), 304 ($\epsilon$: 2,292). IR-spectra: $\nu_{max.}^{"Nujol"}$ cm.$^{-1}$: 1741, 1670, 1579, 1500, 1190; $\nu_{max.}^{chloroform}$ cm.$^{-1}$: 1725, 1665, 1572, 1493, 1186.

Analysis.—Calcd. for $C_{24}H_{32}O_3S$: C, 71.96; H, 8.05; S, 8.01. Found: C, 71.80; H, 8.12; S, 8.13.

The starting material of this example, 6β-bromo-17β-propionyloxy-4-androsten-3-one, is prepared from testosterone propionate according to the following scheme:

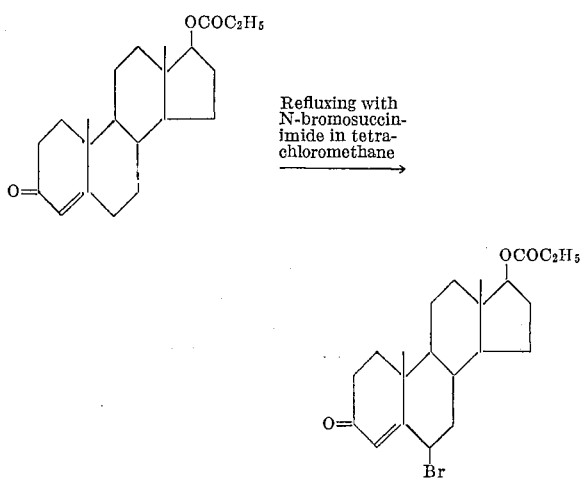

EXAMPLE 20

Preparation of 17β-acetyloxy-5'-methylthieno[4',3',2'-4,5,6]-5-estren-3-one and 17β-hydroxy-5'-methylthieno[4',3',2'-4,5,6]-5-estren-3-one

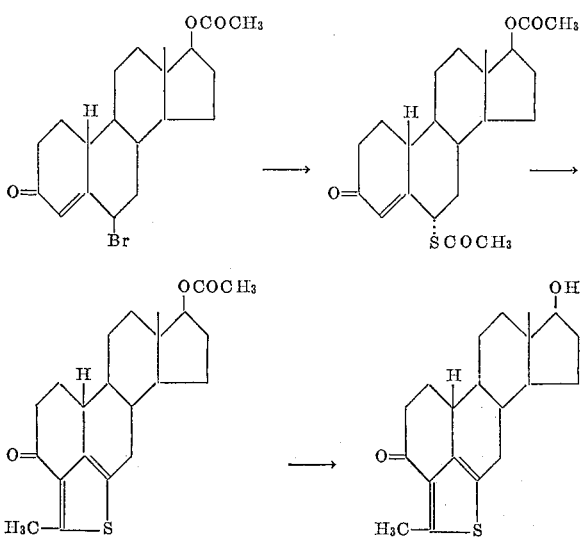

(A) To a solution of 6β-bromo-17β-acetyloxy-4-estren-3-one (1.14 g.) in acetone (40 ml.), there is added potassium thiolacetate (0.67 g.), and the resultant mixture is stirred for 4 hours at room temperature (10 to 30° C.). The reaction mixture is combined with water and shaken with ether. The ether layer is washed with water, dried over anhydrous sodium sulfate and concentrated. The residue is chromatographed on activated magnesium silicate. The fraction eluated with benzene-ether (9:1–1:1) is concentrated to give 6α-acetylthio-17β-acetyloxy-4-estren-3-one (1.00 g.) as an oil.

IR-spectrum: $\nu_{max.}^{CCl_4}$ cm.$^{-1}$: 1746, 1696 (shoulder), 1688, 1626, 1138, 1250.

(B) A mixture of 6α-acetylthio-17β-acetyloxy-4-estren-3-one (0.22 g.) and sodium hydride (0.08 g., suspended in oil) in toluene (10 ml.) is refluxed for 5 hours. After cooling, the reaction mixture is combined with water and shaken with ether. The ether layer is separated, washed with water, dried over anhydrous sodium sulfate and evaporated to dryness. The residue is chromatographed on activated magnesium silicate (4 g.). The fraction eluated with benzene-ether is concentrated and crystallized from a mixture of water and methanol to give 17β-acetyloxy - 5' - methylthieno[4',3',2'-4,5,6] - 5 - estren-3-one (0.12 g.) as crystals melting at 171 to 172° C. $[\alpha]_D^{24.5}$ −62.8±2° (C.=0.955, chloroform).

UV-spectrum: $\lambda_{max.}^{ethanol}$ mμ: 221.5 ($\epsilon$: 12,333), 267.5 ($\epsilon$: 11,138), 303 ($\epsilon$: 2,197). IR-spectrum: $\nu_{max.}^{CCl_4}$ cm.$^{-1}$: 1741, 1675, 1573, 1495, 1247; $\nu_{max.}^{chloroform}$ cm.$^{-1}$: 1728, 1666, 1573, 1492, 1256, 1041.

Analysis.—Calcd. for $C_{22}H_{28}O_3S$: C, 70.93; H, 7.58; S, 8.61. Found: C, 70.88; H, 7.58; S, 8.90.

(C) To a solution of 17β-acetyloxy-5'-methylthieno[4',3',2'-4,5,6]-5-estren-3-one (0.12 g.) in a mixture of water and methanol, there is added potassium carbonate (0.20 g.), and the resultant mixture is refluxed for 30 minutes. After removal of the solvent, the reaction mixture is combined with water. The separated crystals are collected by filtration and recrystallized from ethanol to give 17β - hydroxy - 5' - methylthieno[4',3',2'-4,5,6]-5-estren-3-one (0.09 g.) as crystals melting at 215 to 217° C. $[\alpha]_D^{23.5}$ −58.7±2° (C.=1.040, chloroform).

UV-spectrum: $\lambda_{max.}^{ethanol}$ mμ: 221.5 ($\epsilon$: 13,107), 267.5 ($\epsilon$: 12,041), 303 ($\epsilon$: 2,263). IR-spectrum: $\nu_{max.}^{chloroform}$ cm.$^{-1}$ 3638, 3476, 1667, 1573, 1493, 1051.

Analysis.—Calcd. for $C_{20}H_{26}O_2S$: C, 72.68; H, 7.93; S, 9.70. Found: C, 72.62; H, 7.92; S, 9.74.

The starting material of this example, 6β-bromo-17β-acetyloxy-4-estren-3-one, is prepared from 3,17β-diacetyloxy - 3,5 - estradiene [Velluz et al.: French Patent 1,180,907] according to the following scheme:

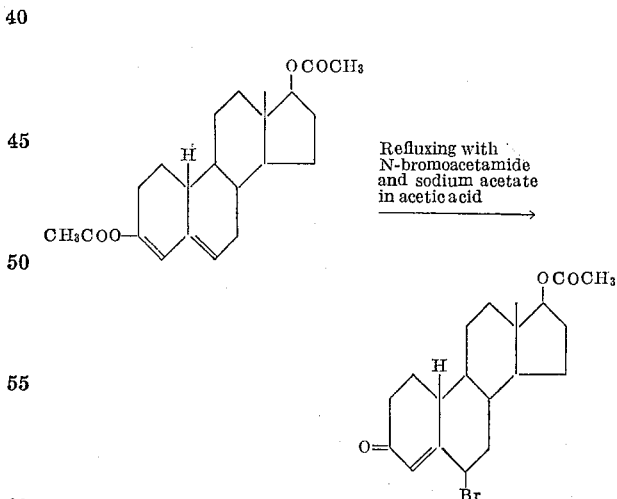

EXAMPLE 21

Preparation of 17β-hydroxy-5'-methylthieno[4',3',2'-4,5,6]-5-estren-3-one

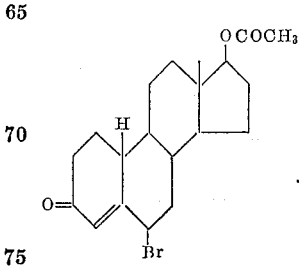

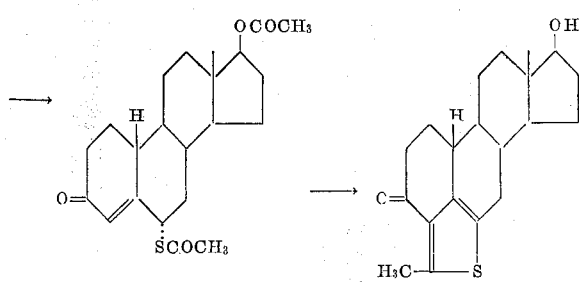

(A) 6β - bromo - 17β - acetyloxy - 4 - estren - 3 - one is reacted with potassium thiolacetate in acetone as in Example 20(A) whereby 6α - acetylthio - 17β - acetyloxy-4-estren-3-one is produced.

(B) To a solution of 6α-acetylthio-17β-acetyloxy-4-estren-3-one (0.42 g.) in t-butanol (20 ml.), there is added a mixture of metallic potassium (0.10 g.) and t-butanol (10 ml.), and the resultant mixture is allowed to stand at room temperature (10 to 30° C.) overnight. The reaction mixture is combined with water and shaken with ether. The ether layer is separated, washed with water, dried over anhydrous sodium sulfate and concentrated to dryness. The residue is chromatographed on activated magnesium silicate (4 g.). The fraction eluated with benzene-ether is concentrated and crystallized from a mixture of ether and methanol to give 17β-hydroxy - 5' - methylthieno[4',3',2'-4,5,6] - 5 - estren-3-one (0.12 g.) as crystals melting at 215 to 217° C.

EXAMPLE 22

*Preparation of 17β-acetyloxy-17α-ethynyl-5'-methylthieno[4',3',2'-4,5,6]-5-estren-3-one*

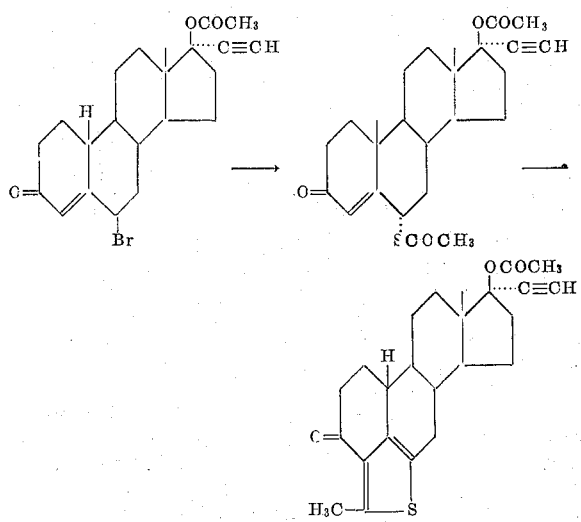

(A) To a solution of 6β-bromo-17β-acetyloxy-17α-ethynyl-4-estren-3-one (0.80 g.) in acetone (30 ml.), there is added potassium thiolacetate (0.78 g.), and the resultant mixture is allowed to stand at room temperature (10 to 30° C.) for 2.5 hours. The reaction mixture is combined with water and shaken with ether. The ether layer is separated, washed with water, dried over anhydrous sodium sulfate and concentrated. The residue is crystallized from ether to give crystals (0.34 g.). The mother liquor of crystallization is concentrated and chromatographed on activated magnesium silicate. The fraction eluated with ether-benzene is concentrated and crystallized from ether to give additional crystals (0.15 g.). The above-obtained crystals are combined together and recrystallized from a mixture of acetone and hexane to give 6α - acetylthio - 17β - acetyloxy - 17α - ethynyl - 4 - estren-3-one (0.42 g.) as crystals melting at 216 to 219° C. (decomp.). $[\alpha]_D^{23.5}$ −34.4±2° (C.=0.999, chloroform).

UV-spectrum: $\lambda_{max.}^{ethanol}$ 235.5 mμ (ε: 17,343). IR-spectrum: $\nu_{max.}^{chloroform}$ cm.$^{-1}$: 3300, 1742, 1690 (shoulder), 1674, 1623, 1260, 1134, 1120, 1022.

*Analysis.*—Calcd. for $C_{24}H_{30}O_4S$: C, 69.53; H, 7.29; S, 7.74. Found: C, 69.54; H, 7.35; S, 7.86.

(B) A mixture of 6α - acetylthio - 17β - acetyloxy - 17α-ethynyl-4-estren-3-one (0.20 g.), sodium hydride (0.10 g.) and toluene (20 ml.) is refluxed for 3 hours. The reaction mixture is combined with water and shaken with ether. The ether layer is separated, washed with water, dried over anhydrous sodium sulfate and concentrated. The residue is chromatographed on alumina (9 g.). The fraction eluated with benzene-petroleum ether (1:1–2:1) is concentrated and crystallized from ethanol to give 17β-acetyloxy - 17α - ethynyl - 5' - methylthieno[4',3',2'-4,5,6]-5-estren-3-one (0.08 g.) as crystals melting at 200 to 202° C. (decomp.).

The starting material of this example, 6β-bromo-17β-acetyloxy-17α-ethynyl-4-estren-3-one, is prepared from 3,17β - diacetyloxy - 17α-ethynyl-3,5-estradiene [Colton: U.S. Patent 2,946,809] according to the following scheme:

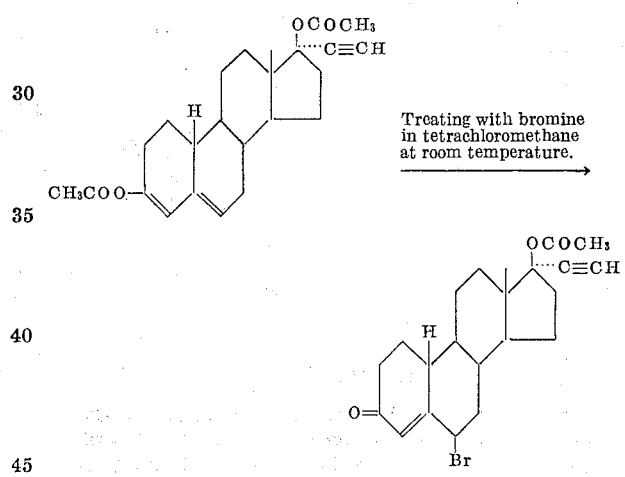

Treating with bromine in tetrachloromethane at room temperature.

EXAMPLE 23

*Preparation of 17β-hydroxy-17α-ethynyl-5'-methyl-thieno[4',3',2'-4,5,6]-5-estren-3-one*

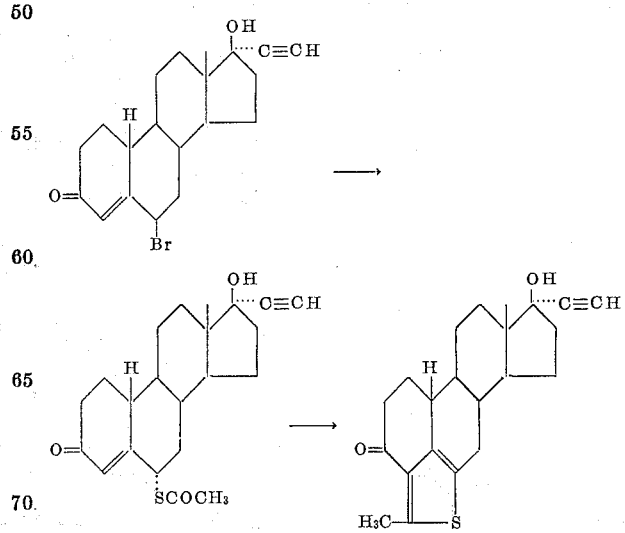

(A) To a solution of 6β-bromo-17β-hydroxy-17α-ethynyl-4-estren-3-one (4.57 g.) in acetone (70 ml.), there is added potassium thiolacetate (2.80 g.), and the resultant mixture is stirred for 3 hours at room temperature (10 to 30° C.). The reaction mixture is combined with water and shaken with ether. The ether layer is separated, washed with water, dried over anhydrous sodium sulfate and concentrated to give 6α-acetylthio-17β-hydroxy-17α-ethynyl-4-estren-3-one (1.44 g.) as an oil.

IR-spectrum: $\nu_{max.}^{CCl_4}$ cm.$^{-1}$: 3626, 3286, 1700, 1687, 1622, 1130.

(B) 6α - acetylthio-17β-hydroxy-17α-ethynyl-4-estren-3-one is reacted with sodium ethoxide in ethanol as in Example 16(B) whereby 17β-hydroxy-17α-ethynyl-5'-methylthieno[4',3',2'-4,5,6]-5-estren-3-one is produced.

The starting material of this example, 6β-bromo-17β-hydroxy-17α-ethynyl-4-estren-3-one, is prepared from 3-ethoxy-17β-hydroxy-17α-ethynyl-3,5-estradiene [Knox et al.: J. Am. Chem. Soc., vol. 82, p. 1230 (1960)] according to the following scheme:

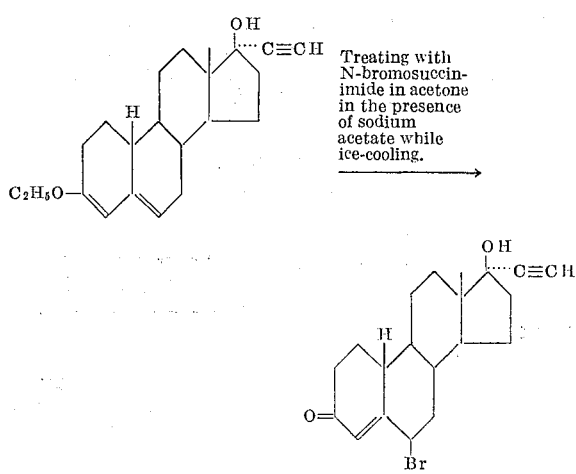

EXAMPLE 24

*Preparation of 17,20,20,21-bismethylenedioxy-5'-methylthieno[4',3',2'-4,5,6]-5-pregnen-3-one, 17α,21-dihydroxy - 5'-methylthieno[4',3',2'-4,5,6]-5-pregnene-3,20-dione and 17α-hydroxy-21-acetyloxy-5'-methylthieno[4',3',2'-4,5,6]-5-pregnene-3,20-dione*

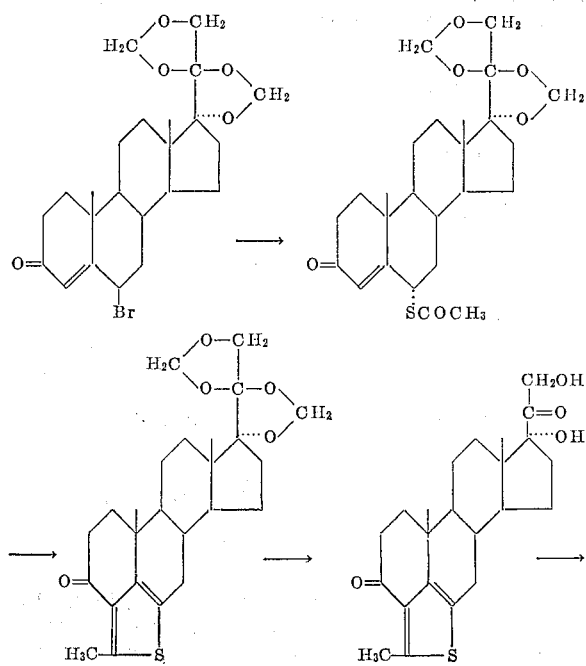

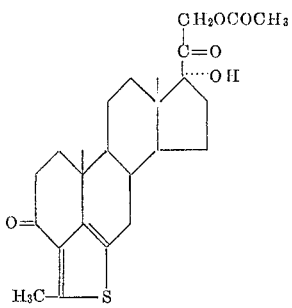

(A) To a mixture of 6α-bromo-17,20,20,21-bismethylenedioxy-4-pregnen-3-one (3.33 g.) in dimethylformamide (40 ml.), there is added potassium thiolacetate (1.70 g.), and the resultant mixture is stirred at room temperature (10 to 30° C.) for 4 hours. The reaction mixture is combined with water. The precipitate is collected by filtration, washed with water and dried to give 6α-acetylthio - 17,20,20,21 - bismethylenedioxy - 4-pregnen-3-one (2.98 g.).

IR-spectrum: $\nu_{max.}^{CCl_4}$ cm.$^{-1}$: 1701, 1684, 1611, 1133, 1103, 1088.

(B) To a solution of 6α-acetylthio-17,20,20,21-bismethylenedioxy-4-pregnen-3-one (2.98 g.) in toluene (100 ml.), there is added sodium hydride (0.70 g., 50% in oil), and the resultant mixture is refluxed for 4 hours. After cooling, the reaction mixture is washed with water. dried over anhydrous sodium sulfate and concentrated. The residue is crystallized from acetone to give crude crystals (2.10 g.). The mother liquor of crystallization is concentrated and cromatographed on activated magnesium silicate. The fraction eluated with benzene-chloroform (9:1–1:1) is concentrated and crystallized from acetone to give additional crude crystals (0.35 g.). The thus-obtained crude crystals are combined together and recrystallized from a mixture of dichloromethane and acetone to give 17,20,20,21-bismethylenedioxy-5'-methylthieno[4',3',2'-4,5,6]-5-pregnen-3-one (2.20 g.) as crystals melting at 286 to 287° C. $[\alpha]_D^{23.5}$ −107.5 ± 2° (C.=0.962, chloroform).

UV-spectrum: $\lambda_{max.}^{ethano}$ mμ: 221 (ε: 12,710), 268.5 (ε: 11, 520), 304 (ε: 2,310). IR-spectrum: $\nu_{max.}^{Nujol}$ cm.$^{-1}$: 1673, 1569, 1494, 1096, 1090, 949.

*Analysis.*—Calcd. for $C_{25}H_{32}O_5S$: C, 67.54; H, 7:21; S, 7.21. Found: C, 67.70; H, 7.31; S, 7.72.

(C) 17,20,20,21 - bismethylenedioxy - 5'-methylthieno-[4',3',2'-4,5,6]-5-pregnen-3-one (2.00 g.) is combined with 70% formic acid (110 ml.) and ethyleneglycol (20 ml.), and the resultant mixture is heated at 100° C. for 2 hours. The reaction mixture is combined with water and shaken with chloroform. The chloroform layer is separated, washed with dilute sodium carbonate solution and water in order, dried over anhydrous sodium sulfate and concentrated. The residue is dissolved in methanol (80 ml.) and combined with 10% sulfuric acid (25 ml.). The resulting mixture is allowed to stand at room temperature (10 to 30° C.) for 2 hours. The reaction mixture is combined with water and shaken with dichloromethane. The dichloromethane layer is washed with dilute sodium carbonate solution and water in order, dried over sodium sulfate and concentrated. The residue is crystallized from methanol and recrystallized from a mixture of dichloromethane and ethanol to give 17α,21-dihydroxy - 5' - methylthieno-[4',3',2'-4,5,6]-5-pregnene-3,20-dione (0.43 g.) as crystals melting at 230 to 232° C. $[\alpha]_D^{24}$ −18.1±2° (C=1.012, chloroform).

UV-spectrum: $\lambda_{max.}^{ethanol}$ mμ: 220.5 (ε: 14,050), 268.5 (ε: 12, 410), 302 (ε: 2,470). IR-spectrum: $\nu_{max.}^{Nujol}$ cm$^{-1}$: 3454, 3431, 1710, 1660, 1574, 1493.

*Analysis.*—Calcd. for $C_{22}H_{30}O_4S$: C, 68.62; H, 7.51; S, 7.97. Found: C, 68.41; H, 7.48; S, 8.05.

(D) To a solution of 17α,21-dihydroxy-5'-methylthieno[4',3',2'-4,5,6]-5-pregnene-3,20-dione (0.10 g.) in pyridine (2 ml.), there is added acetic anhydride (0.5 ml.), and the resultant mixture is allowed to stand at room temperature (10 to 30° C.) overnight. The reaction mixture is combined with water. The separated crystals are collected by filtration, dried and recrystallized from methanol to give 17α-hydroxy-21-acetyloxy-5'-methylthieno[4',3',2'-4,5,6]-5-pregnene-3,20-dione (0.08 g.) as crystals melting at 222 to 224° C.

The starting material of this example, 6β-bromo-17,20,20,21 - bismethylenedioxy - 4-pregnen-3-one, is prepared from 17,20,20,21 - bismethylenedioxy - 4-pregnen-3-one [Beyler et al.: J. Org. Chem., vol. 26, p. 2421 (1961)] according to the following scheme:

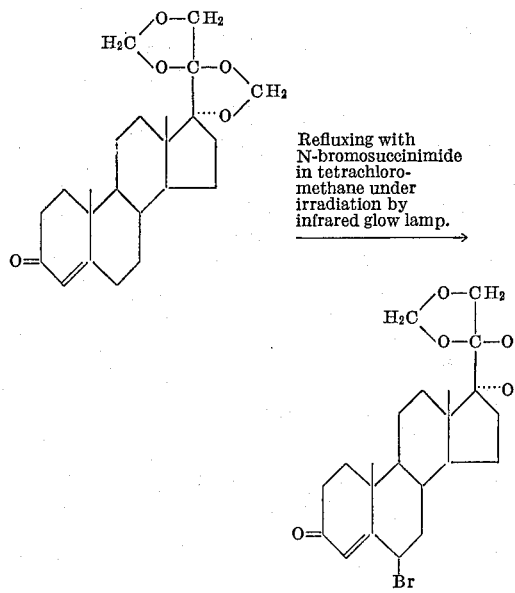

EXAMPLE 25

Preparation of 17,20,20,21-bismethylenedioxy-5'-methylthieno[4',3',2'-4,5,6]-5 - pregnene-3,11-dione, 17α,21-dihydroxy-5'-methylthieno[4',3',2'-,4,5,6] - 5-pregnene-3,11,20 - trione and 17α-hydroxy-21-acetyloxy - 5'-methylthieno[4',3',2'-4,5,6]-5-pregnene-3,11,20-trione

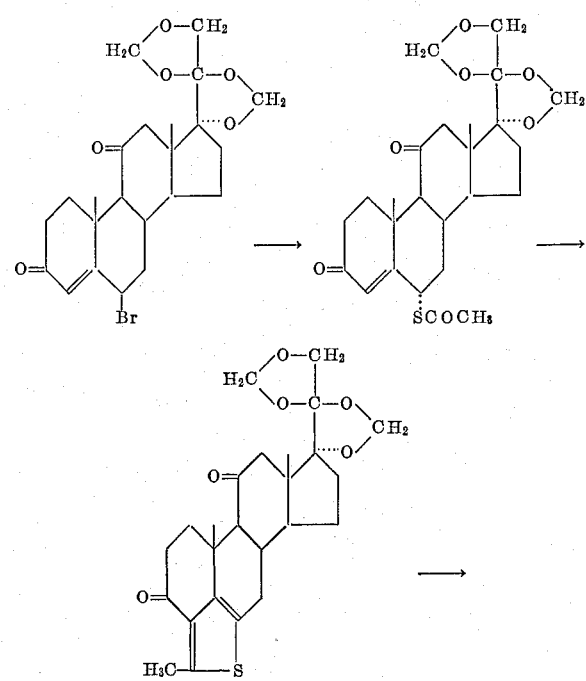

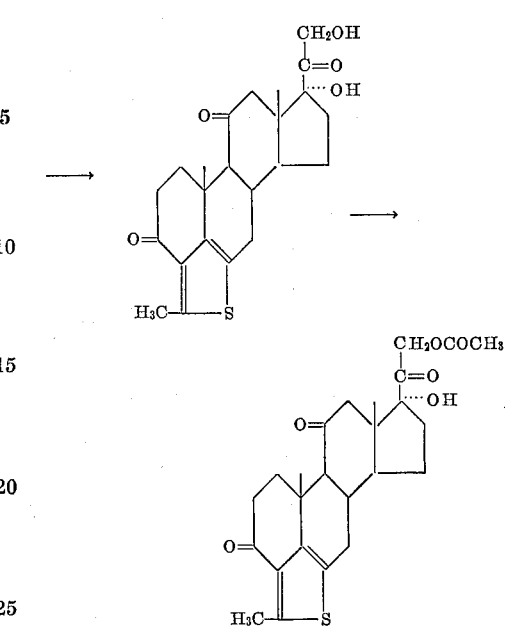

(A) To a solution of 6β-bromo-17,20,20,21-bismethylene-dioxy-4-pregnene-3,11-dione (3.42 g.) in dimethylformamide (40 ml.), there is added potassium thiolacetate (1.62 g.), and the resultant mixture is stirred at room temperature (10 to 30° C.) for 5 hours. The reaction mixture is combined with water. The precipitate is collected by filtration, crystallized from a mixture of acetone and hexane and recrystallized from a mixture of dichloromethane and methanol to give 6α-acetylthio-17,20,20,21-bismethylenedioxy-4-pregnene - 3,11 - dione (2.43 g.) as crystals melting at 234 to 236° C. $[\alpha]_D^{23.5}$ +140.3±2° (C.=0.965, chloroform).

IR-spectrum: $\nu_{max.}^{"Nujol"}$ cm.$^{-1}$: 1690, 1675, 1609, 1135, 1098, 1081

(B) 6α-acetylthio-17,20,20,21 - bismethylenedioxy - 4-pregnene-3,11-dione (2.30 g.) is dissolved in toluene (70 ml.) and sodium hydride (0.48 g., 50% in oil) is added thereto. The resultant mixture is refluxed for 5 hours. After cooling, the reaction mixture is shaken with chloroform. The chloroform layer is separated, washed with water, dried over anhydrous sodium sulfate and concentrated to dryness. The residue is crystallized from acetone to give crude crystals (1.70 g.). The mother liquor of crystallization is chromatographed on activated magnesium silicate. The fraction eluated with chloroform-benzene (1:9–1:1) is concentrated to give additional crude crystals (0.24 g.). The above-obtained crude crystals are combined together and recrystallized from a mixture of dichloromethane and acetone to give 17,20,20,21-bismethylenedioxy-5' - methylthieno[4',3',2'-4,5,6] - 5-pregnene-3,11-dione as crystals melting at 263 to 264.5° C. $[\alpha]_D^{24}$ —47.7±2° (C.=1.005, chloroform).

IR-spectrum: $\nu_{max.}^{"Nujol"}$ cm.$^{-1}$: 1698, 1668, 1571, 1493, 1099, 1076

Analysis.—Calcd. for $C_{25}H_{30}O_6S$: C, 65.48; H, 6.59; S, 6.99. Found: C, 65.32; H, 6.65; S, 7.03.

(C) 17,20,20,21-bismethylenedioxy-5' - methylthieno[4',3',2'-4,5,6]-5-pregnene - 3,11-dione is treated as in Example 24(C) whereby 17α,21-dihydroxy - 5'-methylthieno[4',3',2'-4,5,6] - 5-pregnene-3,11,20-trione is produced.

(D) 17α,21-dihydroxy - 5'-methylthieno[4',3',2' - 4,5,6] - 5-pregnene - 3,11,20-trione is treated as in Example 24(D) whereby 17α-hydroxy-21-acetyloxy-5' - methylthieno[4',3',2'-4,5,6] - 5-pregnene - 3,11,20-trione is produced.

The starting material of this example, 6β-bromo-17,20, 20,21-bismethylenedioxy-4-pregnene-3,11 - dione, is prepared from 17,20,20,21-bismethylenedioxy - 4-pregnene-3,11-dione [Beal et al.: J. Org. Chem., vol. 27, p. 1752 (1962)] according to the following scheme:

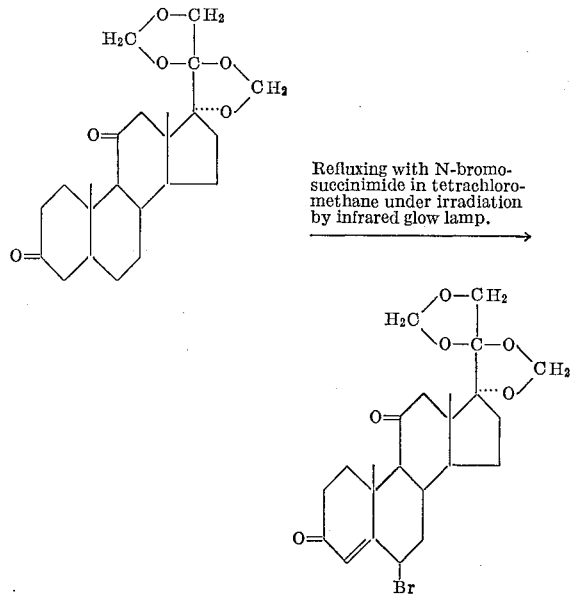

EXAMPLE 26

Preparation of 5'-methylfuro[4',3',2'-4,5,6] - 5-pregnene-3,20-dione

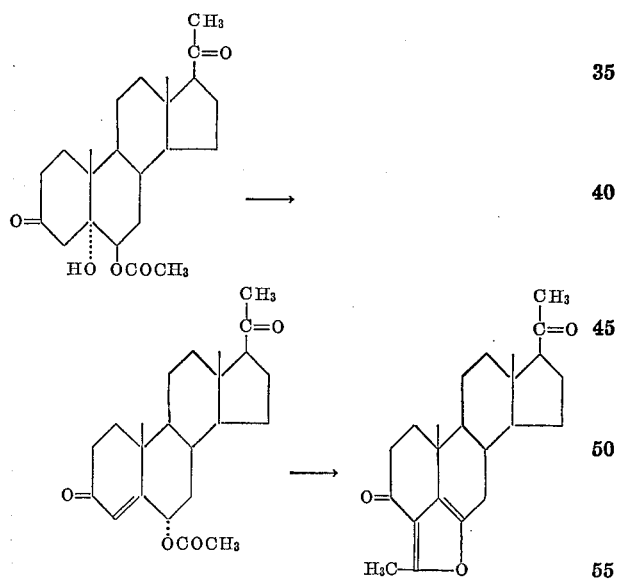

(A) 5α-hydroxy-6β - acetyloxy - 5α-pregnane - 3,20-dione (2.60 g.) is dissolved in acetic acid (50 ml.), and dry hydrogen chloride is passed through thereto for 3.5 hours while cooling with ice. The resultant mixture is allowed to stand at room temperature (10 to 30° C.) for 1 hour. The reaction mixture is combined with water and shaken with ether. The ether layer is separated, washed with dilute sodium carbonate solution and water in order, dried over anhydrous sodium sulfate and concentrated. The residue is chromatographed on activated magnesium silicate. The fraction eluated with benzene-ether is concentrated to give 6α-acetyloxy-4-pregnene-3,20-dione (2.07 g.) as an oil.

IR-spectrum: $\nu_{max.}^{chloroform}$ cm.$^{-1}$: 1744, 1714, 1690, 1623, 1234.

(B) In nitrogen stream, 6α-acetyloxy - 4-pregnene-3,20-dione (4.40 g.) is refluxed with sodium hydride (1.7 g., 50% in oil) in xylene (150 ml.) for 49 hours. The reaction mixture is combined with a mixture of ice and water and shaken with ether. The ether layer is washed with water, dried over anhydrous sodium sulfate and concentrated under reduced pressure. The residue is chromatographed on activated magnesium silicate (85 g.). The fraction eluated with benzene-ether (9:1–1:1) is concentrated, crystallized from a mixture of ether and petroleum ether and recrystallized from methanol to give 5'-methylfuro[4',3',2'-4,5,6] - 5-pregnene - 3,20-dione (1.20 g.) as crystals melting at 161 to 162° C. $[\alpha]_D^{26.5}$ −46.3±2° (C.=1.028 chloroform).

UV-spectrum: $\lambda_{max.}^{ethanol}$ mμ: 208.5 (ε: 16,000), 298.5 (ε: 3,260). IR-spectrum: $\nu_{max.}^{chloroform}$ cm.$^{-1}$: 1707, 1690, 1662, 1582.

Analysis.—Calcd. for $C_{23}H_{30}O_3$: C, 77.93; H, 8.53. Found: C, 78.23; H, 8.58.

The starting material of this example, 5α-hydroxy-6β-acetyloxy-5α-pregnene-3,20-dione, is known [Ehrenstein et al.: J. Org. Chem., vol. 6, p. 908 (1941)].

EXAMPLE 27

Preparation of 17,20,20,21-bismethylenedioxy - 5'-methylfuro[4',3',2'-4,5,6,]-5 - pregnene - 3-one and 17α,21-dihydroxy - 5'-methylfuro[4',3',2'-4,5,6] - 5-pregnene-3,20-dione

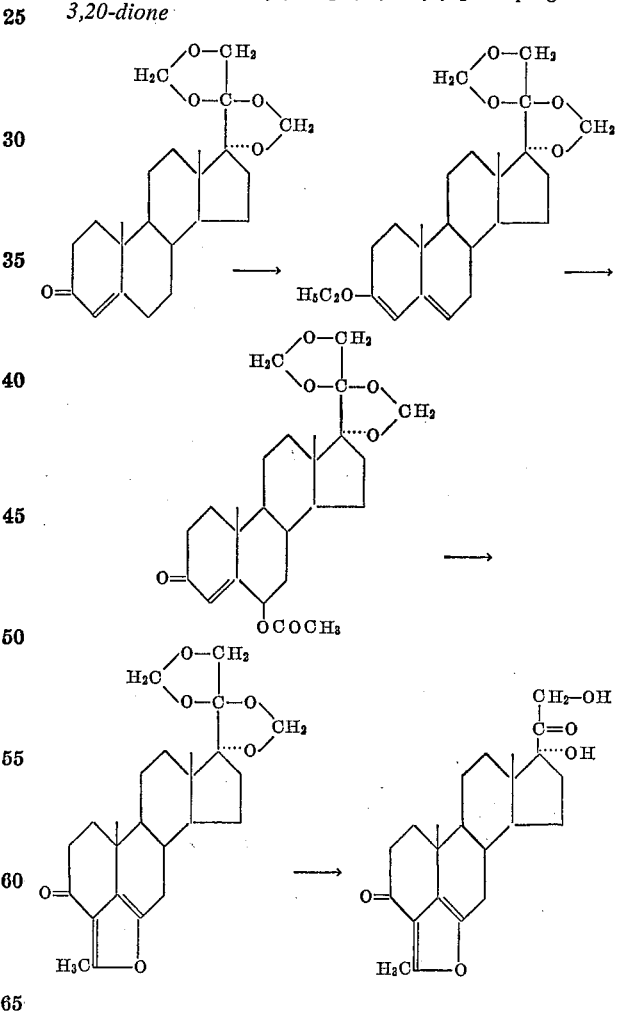

(A) 17,20,20,21 - bismethylenedioxy - 4 - pregnen-3-one (2.06 g.) is dissolved in anhydrous benzene (50 ml.) and a mixture of anhydrous ethanol (5 ml.), ethyl orthoformate (5 ml.) and pyridine hydrochloride (0.12 g.) is added thereto. The resultant mixture is refluxed for 1 hour. After cooling, the reaction mixture is combined with dilute sodium carbonate solution and shaken with a mixture of benzene and dichloromethane. The organic solvent layer is washed with water, dried over anhydrous sodium sulfate and concentrated under reduced pressure. The residue is crystallized from methanol to give 3-ethoxy-17,20,20,21 - bismethylenedioxy-3,5-pregnadiene (2.25 g.) as crystals melting at 169 to 170° C.

(B) To a solution of 3-ethoxy-17,20,20,21-bismethylenedioxy-3,5-pregnadiene (8.47 g.), there is added a solution of monoperphthalic acid (3.60 g.) in ether (35 ml.), and the resultant mixture is allowed to stand in a refrigertor (around 0° C.) for 100 hours. After elimination of separated phthalic acid by filtration, the filtrate is washed with dilute sodium carbonate solution and water in order, dried over anhydrous sodium sulfate and concentrated. The residue is crystallized from ether to give 6β-hydroxy-17,20,20,21-bismethylenedioxy - 4-pregnen-3-one (4.53 g.) as crystals melting at 222 to 223° C. The thus obtained 6β-hydroxy-17,20,20,21-bismethylenedioxy-4-pregnen-3-one (4.53 g.) is dissolved in pyridine (14 ml.), combined with acetic anhydride (9 ml.) and allowed to stand at room temperature (10 to 30° C.) overnight. The reaction mixture is poured onto a mixture of ice and water and shaken with a mixture of ether and dichloromethane. The organic solvent layer is separated, washed with dilute hydrochloric acid, dilute sodium carbonate solution and water in order, dried over anhydrous sodium sulfate and concentrated. The residue is crystallized from ether to give 6β-acetyloxy-17,20,20,21-bismethylenedioxy - 4-pregnen-3-one (4.64 g.) as crystals melting at 171 to 172° C.

(C) 6β-acetyloxy - 17,20,20,21-bismethylenedioxy - 4-pregnen-3-one (5.90 g.) is refluxed with sodium hydride (2.50 g., 50% in oil) in xylene (300 ml.) for 20 hours. The reaction mixture is combined with methanol and shaken with benzene. The benzene layer is washed with water, dried over anhydrous sodium sulfate and concentrated under reduced pressure. The residue (4.82 g.) is chromatographed on alumina (90 g.). The fraction eluated with petroleum ether-benzene (1:1) is concentrated. The residue (2.5 g.) is again chromatographed on alumina (50 g.). The fraction eluated with petroleum ether-benzene (2:1) is concentrated, crystallized from ether and recrystallized from acetone to give 17,20,20,21-bismethylenedioxy-5' - methylfuro - [4',3',2'-4,5,6]-5 - pregnen-3-one (0.54 g.) as crystals melting at 220 to 222° C. $[\alpha]_D^{24}$ −182.4±2° (C.=1.049, chloroform).

UV-spectrum: $\lambda_{max.}^{ethanol}$ mμ: 210 (ε: 14,030), 297 (ε: 3,190), 230 (shoulder, ε: 7,550). IR-spectrum: $\nu_{max.}^{Nujol}$ cm.$^{-1}$: 1688, 1662, 1586, 1095, 1076, 939

Analysis.—Calcd. for $C_{25}H_{32}O_6$: C, 70.07; H, 7.53. Found: C, 70.32; H, 7.59.

(D) 17,20,20,21 - bismethylenedioxy - 5' - methylfuro [4',3',2'-4,5,6]-5-pregnen-3-one (0.54 g.) is combined with 60% formic acid (20 ml.) and ethyleneglycol (10 ml.), and the resultant mixture is heated on a water bath for 1 hour. After cooling, the reaction mixture is combined with water and shaken with dichloromethane. The dichloromethane layer is separated, washed with dilute sodium carbonate solution and water in order, dried over anhydrous sodium sulfate and concentrated under reduced pressure. The residue is crystallized from ether and recrystallized from a mixture of dichloromethane and methanol to give 17α,21-dihydroxy-5'-methylfuro[4',3',2'-4,5,6]-5-pregnene-3,20-dione (0.18 g.) as crystals melting at 245 to 248° C. $[\alpha]_D^{24}$ −101±2° (pyridine).

UV-spectrum: $\lambda_{max.}^{ethanol}$ mμ: 209.5 (ε: 15,090), 297 (ε: 3,350), 230 (shoulder, ε: 7,220). IR-spectrum: $\nu_{max.}^{Nujol}$ cm.$^{-1}$: 3466, 1702, 1684, 1652, 1570.

Analysis.—Calcd. for $C_{23}H_{30}O_5$: C, 71.48; H, 7.82. Found: C, 71.28; H, 7.83.

The starting material of this example, 17,20,20,21-bismethylenedioxy-4-pregnen-3-one, is known [Beyler et al.: J. Org. Chem., vol. 26, p. 2421 (1961)].

EXAMPLE 28

Preparation of 17β-acetyloxy-5'-methylfuro[4',3',2'-4,5,6]-5-androsten-3-one and 17β-hydroxy-5'-methylfuro [4',3',2'-4,5,6]-5-androsten-3-one

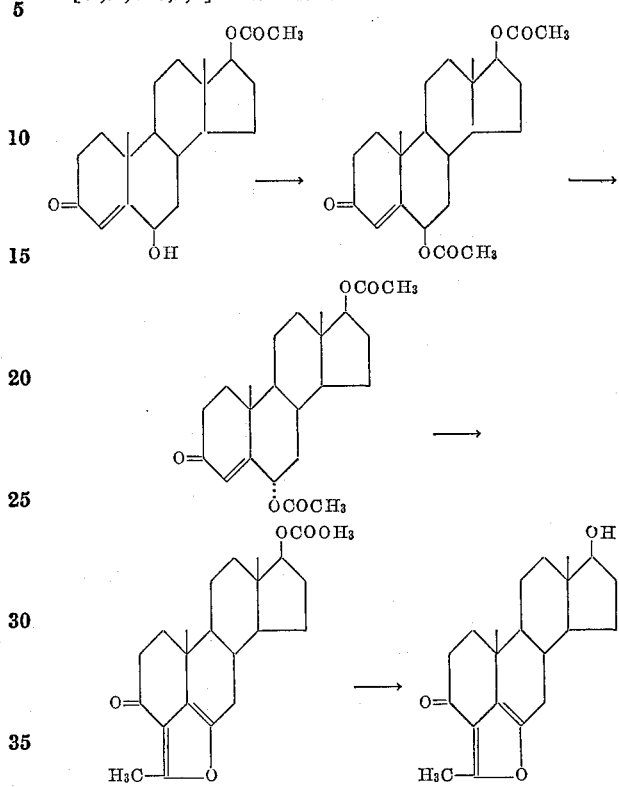

(A) 6β-hydroxy-17β-acetyloxy-4-androsten-3-one (8.50 g.) is combined with pyridine (60 ml.) and acetic anhydride (30 ml.), and the resultant mixture is allowed to stand at room temperature (10 to 30° C.) overnight. The reaction mixture is combined with a mixture of ice and water and shaken with ether. The ether layer is washed with dilute hydrochloric acid solution, water, dilute sodium carbonate solution and water in order, dried over anhydrous sodium sulfate and concentrated to give 6β,17β-diacetyloxy-4-androsten-3-one (7.07 g.)

(B) 6β,17β-diacetyloxy-4-androsten-3-one (7.07 g.) is dissolved in acetic acid (100 ml.) and dry hydrogen chloride is passed through thereto for 2 hours while cooling with ice. The resultant mixture is allowed to stand at room temperature (10 to 30° C.) overnight. The reaction mixture is combined with water and shaken with a mixture of ether and chloroform. The organic solvent layer is separated, washed with dilute sodium carbonate solution and water in order, dried over anhydrous sodium sulfate and concentrated. The residue is crystallized from ether and recrystallized from methanol to give 6α,17β-diacetyloxy-4-androsten-3-one (6.38 g.) as crystals melting at 192 to 194° C. $[\alpha]_D^{24.5}$ +76.6±2° (C.=0.993, chloroform).

UV-spectrum: $\lambda_{max.}^{ethanol}$ 237 mμ (ε: 14,756). IR-spectrum: $\nu_{max.}^{chloroform}$ cm$^{-1}$: 1745, 1686, 1626, 1236.

Analysis.—Calcd. for $C_{23}H_{32}O_5$: C, 71.10; H, 8.30. Found: C, 70.95; H, 8.50.

(C) 6α,17β-diacetyloxy-4-androsten-3-one (2.00 g.) is combined with sodium hydride (0.8 g., 50% in oil) and xylene (60 ml.), and the resultant mixture is refluxed for 17 hours. The reaction mixture is combined with a mixture of ice and water and shaken with ether. The ether layer is separated, washed with water, dried over anhydrous sodium sulfate and concentrated under reduced pressure. The residue (1.85 g.) is chromatographed on alumina (36 g.). The fractions eluated with petroleum ether-benzene (4:1–1:1) and benzene are combined together, concentrated and crystallized from a mixture of water and methanol to give 17β-acetyloxy-5'-methylfuro[4',3',2'-4,5,6]-5-androsten-3-one (0.59 g.) as crystals melting at 128 to 130° C. $[\alpha]_D^{25.5}$ $-116.3\pm2°$ (C=0.982, chloroform).

UV-spectrum: $\lambda_{max.}^{ethanol}$ mμ: 211 (ε: 15,070), 297.5 (ε: 3,300), 230 (shoulder, ε: 7,710). IR-spectrum: $\nu_{max.}^{chloroform}$ cm.$^{-1}$: 1740, 1689, 1664, 1582, 1250.

*Analysis.*—Calcd. for $C_{23}H_{30}O_4$: C, 74.56; H, 8.16. Found: C, 74.84; H, 8.27.

(D) 17β - acetyloxy - 5' - methylfuro[4',3',2'-4,5,6]-5-androsten-3-one (0.59 g.) is refluxed with potassium carbonate (0.80 g.) and 80% aqueous methanol (50 ml.) for 1 hour. The reaction mixture is concentrated under reduced pressure and combined with water. The separated crystals are collected by filtration and recrystallized from a mixture of acetone and hexane to give 17β-hydroxy - 5' - methylfuro[4',3',2'-4,5,6] - 5 - androsten - 3-one (0.32 g.) as crystals melting at 196 to 198° C. $[\alpha]_D^{27}$ $-120.0\pm2°$ (C.=0.982, chloroform).

UV-spectrum: $\lambda_{max.}^{ethanol}$ mμ: 208.5 (ε: 15,120), 296 (3,190), 230 (shoulder, ε: 7,460). IR-spectrum: $\nu_{max.}^{chloroform}$ cm.$^{-1}$: 3644, 1690, 1664, 1583.

*Analysis.*—Calcd. for $C_{21}H_{28}O_3$: C, 76.79; H, 8.59. Found: C, 76.68; H, 8.63.

The starting material of this example, 6β-hydroxy-17β-acetyloxy-4-androsten-3-one, is prepared from testosterone according to the following scheme:

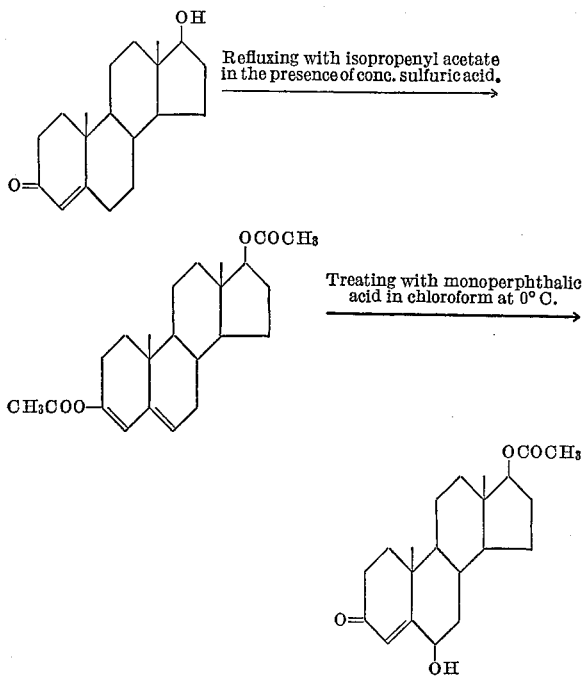

It is to be understood that the invention is not to be limited to the exact details of operation or exact compounds shown and described, it being intended to limit the invention only by the scope of the appended claims.

What is claimed is:

1. A process for preparing steroids having a condensed heterocyclic ring which comprises treating a steroid of the formula:

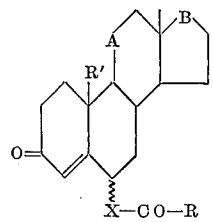

wherein R is a member selected from the group consisting of hydrogen and lower alkyl, R' is a member selected from the group consisting of hydrogen and methyl, X is a member selected from the group consisting of sulfur and oxygen. A is a member selected from the group consisting of methylene, carbonyl and hydroxymethylene and B is a member selected from the group consisting of carbonyl, 17,20,20,21-bismethylenedioxy and a group of the formula:

in which R" is a member selected from the group consisting of hydroxy, lower alkanoyloxy, acetyl, hydroxyacetyl and lower alkanoyloxyacetyl and R''' is a member selected from the group consisting of hydrogen, lower alkyl, lower alkenyl, lower alkynyl, hydroxy and lower alkanoyloxy with a basic agent selected from the group consisting of alumina, alkali metal lower alkoxide, alkali metal hydride and alkali metal carbonate in an inert organic solvent at a temperature from 10–30° C. to reflux temperature to give the corresponding steroid of the formula:

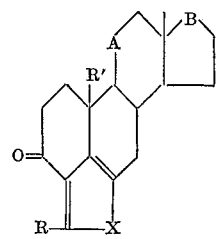

wherein R, R', X, A and B each has the same significance as designated above.

2. A steroid of the formula:

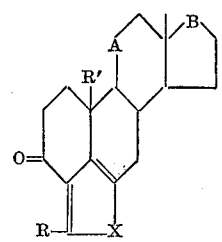

wherein R is a member selected from the group consisting of hydrogen and lower alkyl, R' is a member selected from the group consisting of hydrogen and methyl, X is a member selected from the group consisting of sulfur and oxygen, A is a member selected from the group consisting of methylene, carbonyl and hydroxymethylene and B is a member selected from the group consisting of carbonyl, 17,20,20,21-bismethylenedioxy and a group of the formula:

in which R" is a member selected from the group consisting of hydroxy, lower alkanoyloxy, acetyl, hydroxyacetyl and lower alkanoyloxyacetyl and R''' is a member selected from the group consisting of hydrogen, lower alkyl, lower alkenyl, lower alkynyl, hydroxy and lower alkanoyloxy.

3. 5' - methylthieno[4,3',2'-4,5,6] - 5 - androstene - 3,17-dione.

4. 17β - hydroxy - 5' - methylthieno[4',3',2'-4,5,6] - 5-androsten-3-one.

5. 17β - acetyloxy - 5' - methylthieno[4',3',2'-4,5,6]-5-androsten-3-one.

6. 17β - propionyloxy - 5' - methylthieno[4',3',2'-4,5,6]-5-androsten-3-one.

7. 5'-methylthieno[4',3',2'-4,5,6] - 5 - pregnene - 3,20-dione.

8. 17α - hydroxy - 5' - methylthieno[4',3',2'-4,5,6] - 5-pregnene-3,20-dione.

9. 17α - acetyloxy - 5' - methylthieno[4',3',2'-4,5,6]-5-pregnene-3,20-dione.

10. 17,20,20,21 - bismethylenedioxy - 5' - methylthieno-[4',3',2'-4,5,6]-5-pregnen-3-one.

11. 17α,21 - dihydroxy - 5' - methylthieno[4',3',2'-4,5,6]-5-pregnene-3,20-dione.

12. 17α - hydroxy - 21 - acetyloxy - 5' - methylthieno-[4',3',2'-4,5,6]-5-pregnene-3,20-dione.

13. 17,20,20,21 - bismethylenedioxy - 5' - methylthieno-[4',3',2'-4,5,6]-5-pregnene-3,11-dione.

14. 17α,21 - dihydroxy - 5' - methylthieno[4',3',2'-4,5,6]-5-pregnene-3,11,20-trione.

15. 17α - hydroxy - 21 - acetyloxy - 5' - methylthieno-[4',3',2'-4,5,6]-5-pregnene-3,11,20-trione.

16. 17β - hydroxy - 5' - methylthieno[4',3',2'-4,5,6]-5-estren-3-one.

17. 17β - acetyloxy - 5' - methylthieno[4',3',2'-4,5,6]-5-estren-3-one.

18. 17β - hydroxy - 17α - ethynyl - 5' - methylthieno-[4',3',2'-4,5,6]-5-estren-3-one.

19. 17β - acetyloxy - 17α - ethynyl - 5' - methylthieno-[4',3',2'-4,5,6]-5-estren-3-one.

20. 5' - methylthieno[4',3',2'-4,5,6] - 5 - cholesten-3-one.

21. 17β - hydroxy - 5' - methylfuro[4',3',2'-4,5,6] - 5-androsten-3-one.

22. 17β - acetyloxy - 5' - methylfuro[4',3',2'-4,5,6] - 5-androsten-3-one.

23. 5' - methylfuro[4',3',2'-4,5,6] - 5 - pregnene - 3,20-dione.

24. 17,20,20,21 - bismethylenedioxy - 5' - methylfuro-[4',3',2'-4,5,6]-5-pregnen-3-one.

25. 17α,21 - dihydroxy - 5' - methylfuro[4',3',2'-4,5,6]-5-pregnene-3,20-dione.

No references cited.

LEWIS GOTTS, *Primary Examiner.*
ELBERT L. ROBERTS, *Examiner.*